US010692086B2

(12) United States Patent
Leong et al.

(10) Patent No.: US 10,692,086 B2
(45) Date of Patent: Jun. 23, 2020

(54) DISTRIBUTED LEDGER BASED IDENTITY AND ORIGINS OF SUPPLY CHAIN APPLICATION ENABLING FINANCIAL INCLUSION AND SUSTAINABILITY

(71) Applicant: Accenture Global Solutions Limited, Dublin (IE)

(72) Inventors: Christine Leong, Houston, TX (US); David B. Treat, Chicago, IL (US); Alexandra T. Eyerman, Sunnyvale, CA (US)

(73) Assignee: Accenture Global Solutions Limited, Dublin (IE)

( * ) Notice: Subject to any disclaimer, the term of this patent is extended or adjusted under 35 U.S.C. 154(b) by 167 days.

(21) Appl. No.: 16/115,705

(22) Filed: Aug. 29, 2018

(65) Prior Publication Data

US 2019/0340619 A1 Nov. 7, 2019

Related U.S. Application Data

(60) Provisional application No. 62/667,839, filed on May 7, 2018.

(51) Int. Cl.
*G06Q 20/40* (2012.01)
*G06Q 20/06* (2012.01)
(Continued)

(52) U.S. Cl.
CPC ..... *G06Q 20/40145* (2013.01); *G06Q 10/087* (2013.01); *G06Q 20/065* (2013.01);
(Continued)

(58) Field of Classification Search
CPC ......... G06Q 20/40145; G06Q 20/3674; G06Q 50/02; G06Q 10/087; G06Q 20/065;
(Continued)

(56) References Cited

U.S. PATENT DOCUMENTS 10,115,068 B2 * 10/2018 Vivier ................ G06Q 10/0832
10,176,308 B2 * 1/2019 Mintz ................... H04L 9/0637
(Continued)

FOREIGN PATENT DOCUMENTS

WO WO-2018163044 A1 * 9/2018 ........... G06Q 20/065

OTHER PUBLICATIONS

Mitsuaki Nakasumi (Information Sharing for Supply Chain Management Based on Block Chain Technology) (Year: 2017).*

*Primary Examiner* — Mamon Obeid
(74) *Attorney, Agent, or Firm* — Fish & Richardson P.C.

(57) ABSTRACT

Methods, systems, and apparatus, including computer programs encoded on a computer storage medium, employing a permissioned distributed ledger for the promotion of sustainable agriculture. In one aspect, a method includes receiving, from a purchaser of goods, payment data including a targeted payment amount and a product identifier; locating, on a permissioned distributed ledger, an attestation for a delivery of the purchased goods, the permissioned distributed ledger stores verified transactions within a supply chain for the purchased goods; processing the attestation for a delivery from a producer of the purchased goods to determine the producer of the purchased goods; providing payment information including the targeted payment amount to the producer through a producer application; receiving verification, based on biometric authentication, of an identity of the producer from the producer application; and releasing funds for the targeted payment amount to the producer.

19 Claims, 12 Drawing Sheets

(51) Int. Cl.
  *G06Q 10/08*    (2012.01)
  *H04L 9/06*     (2006.01)
  *G06Q 50/02*    (2012.01)
  *G06Q 20/36*    (2012.01)

(52) U.S. Cl.
  CPC ......... *G06Q 20/3674* (2013.01); *G06Q 50/02* (2013.01); *H04L 9/0637* (2013.01)

(58) Field of Classification Search
  CPC ............ G06Q 20/3821; G06Q 20/3678; H04L 9/0637; H04L 63/08; H04L 63/102; H04W 12/0608; H04W 12/06
  See application file for complete search history.

(56) References Cited

U.S. PATENT DOCUMENTS

| | | | | |
|---|---|---|---|---|
| 10,282,711 B2* | 5/2019 | Chan | | G06Q 10/1097 |
| 10,311,507 B2* | 6/2019 | Stausholm | | G06F 3/04842 |
| 10,489,502 B2* | 11/2019 | Priestas | | G06F 40/30 |
| 2003/0157488 A1* | 8/2003 | Cox | | C12Q 1/6827 |
| | | | | 435/6.18 |
| 2003/0221108 A1* | 11/2003 | Rupp | | G07C 1/00 |
| | | | | 713/176 |
| 2004/0039916 A1* | 2/2004 | Aldis | | G06F 21/105 |
| | | | | 713/177 |
| 2006/0010044 A1* | 1/2006 | Harris | | G06Q 30/0641 |
| | | | | 705/26.43 |
| 2006/0217823 A1* | 9/2006 | Hussey | | G06F 11/2247 |
| | | | | 700/87 |
| 2011/0274275 A1* | 11/2011 | Seitz | | G06Q 10/08 |
| | | | | 380/270 |
| 2015/0339599 A1* | 11/2015 | Lee | | G06Q 20/401 |
| | | | | 705/51 |
| 2016/0098723 A1* | 4/2016 | Feeney | | G06Q 20/065 |
| | | | | 705/75 |
| 2016/0098730 A1* | 4/2016 | Feeney | | G07G 1/0036 |
| | | | | 705/71 |
| 2016/0217454 A1* | 7/2016 | Killoran, Jr. | | G06Q 30/00 |
| 2017/0046526 A1* | 2/2017 | Chan | | H04L 63/062 |
| 2017/0046694 A1* | 2/2017 | Chow | | H04L 63/061 |
| 2017/0046806 A1* | 2/2017 | Haldenby | | H04L 63/062 |
| 2017/0206532 A1* | 7/2017 | Choi | | G06Q 30/02 |
| 2017/0262862 A1* | 9/2017 | Aljawhari | | G06F 16/90335 |
| 2018/0094953 A1* | 4/2018 | Colson | | G06Q 10/0833 |
| 2018/0114261 A1* | 4/2018 | Jayachandran | | G06Q 30/0623 |
| 2018/0167198 A1* | 6/2018 | Muller | | G06F 21/44 |
| 2018/0173203 A1* | 6/2018 | Freer | | G06F 21/62 |
| 2018/0211213 A1* | 7/2018 | Vivier | | H04L 9/3239 |
| 2018/0262340 A1* | 9/2018 | Lee | | H04L 63/0823 |
| 2018/0285810 A1* | 10/2018 | Ramachandran | | G06Q 30/04 |
| 2018/0314809 A1* | 11/2018 | Mintz | | G06F 21/105 |
| 2018/0315108 A1* | 11/2018 | Oh | | G06K 7/1417 |
| 2018/0374131 A1* | 12/2018 | Currie | | G06Q 30/0617 |
| 2019/0236604 A1* | 8/2019 | McHale | | G06Q 20/389 |
| 2019/0340619 A1* | 11/2019 | Leong | | G06Q 20/065 |
| 2020/0074495 A1* | 3/2020 | Unnerstall | | G06Q 20/3678 |
| 2020/0097963 A1* | 3/2020 | Gomes | | G06Q 20/38215 |

* cited by examiner

DISTRIBUTED LEDGER BASED IDENTITY AND ORIGINS OF SUPPLY CHAIN APPLICATION ENABLING FINANCIAL INCLUSION AND SUSTAINABILITY

CROSS-REFERENCE TO RELATED APPLICATION

The present disclosure is related to, and claims priority to, U.S. Provisional Patent Application No. 62/667,839, titled "Distributed Ledger-Based Identity For Sustainability," which was filed on May 7, 2018, the entirety of which is incorporated by reference into the present disclosure.

BACKGROUND

Sustainable agriculture is the production of food, fiber, or other plant or animal products using farming techniques that protect the environment, public health, human communities, and animal welfare. This form of agriculture enables us to produce healthful food without compromising future generations' ability to do the same. Ensuring farmers are incentivized to behave in an environmentally sustainable way has a positive impact on the sustainability of the agriculture they produce as well as sales, revenue, share price, and commitments of the global organizations with which they are in partnership. Furthermore, sustainability is often a primary objective for a number of large organizations across the agriculture sector (as well as the manufacturing sector and others). With the rise in the 'ethical economy' and the changing consumer behavior of the 'Millennials,' consumers are increasingly concerned about the ethics of their choices and the provenance of where their food or clothing comes from. As such, consumers may want to know about particular aspects of the supply chain through which a good was purchased. For example, consumers may want to know: is the production of the goods harming the environment, does it use child labor, and/or does the good cause harm to individuals in developing countries or endanger species?

SUMMARY

Implementations of the present disclosure are generally directed to a system that provides incentive structures to promote sustainable practices within, for example, a supply chain. More specifically, implementations are directed to persisting supply-chain transactions to a permissioned distributed ledger to allow consumers of goods to verify the sustainable practices employed by the producer of the goods and to provide a mechanism for the consumers to provide incentives directly to the producer.

In a general implementation, a system includes one or more processors and a computer-readable storage device coupled to the one or more processors. Instructions are stored on the computer-readable storage device that when executed by the one or more processors, cause the one or more processors to perform operations. These operations include receiving, from a purchaser of goods through a consumer application, payment data. The payment data includes a targeted payment amount and a product identifier for the purchased goods. Based on the product identifier, an attestation for a delivery of the purchased goods is located on a permissioned distributed ledger. The permissioned distributed ledger stores verified transactions within a supply chain for the purchased goods, and wherein the attestation is persisted on the permissioned distributed ledger as one of the verified transactions. The attestation for a delivery from a producer of the purchased goods is processed to determine the producer of the purchased goods. Payment information that includes the targeted payment amount is provided to the producer through a producer application. Verification, based on biometric authentication, of an identity of the producer is received from the producer application. The funds for the targeted payment amount are released to the producer.

In another general implementation, a computer-implemented method executed by one or more processors receiving, from a purchaser of goods through a consumer application, payment data. The payment data includes a targeted payment amount and a product identifier for the purchased goods. Based on the product identifier, an attestation for a delivery of the purchased goods is located on a permissioned distributed ledger. The permissioned distributed ledger stores verified transactions within a supply chain for the purchased goods, and wherein the attestation is persisted on the permissioned distributed ledger as one of the verified transactions. The attestation for a delivery from a producer of the purchased goods is processed to determine the producer of the purchased goods. Payment information that includes the targeted payment amount is provided to the producer through a producer application. Verification, based on biometric authentication, of an identity of the producer is received from the producer application. The funds for the targeted payment amount are released to the producer.

In yet another general implementation, one or more non-transitory computer-readable storage media coupled to one or more processors and having instructions stored thereon which, when executed by the one or more processors, cause the one or more processors to perform operations that include receiving, from a purchaser of goods through a consumer application, payment data. The payment data includes a targeted payment amount and a product identifier for the purchased goods. Based on the product identifier, an attestation for a delivery of the purchased goods is located on a permissioned distributed ledger. The permissioned distributed ledger stores verified transactions within a supply chain for the purchased goods, and wherein the attestation is persisted on the permissioned distributed ledger as one of the verified transactions. The attestation for a delivery from a producer of the purchased goods is processed to determine the producer of the purchased goods. Payment information that includes the targeted payment amount is provided to the producer through a producer application. Verification, based on biometric authentication, of an identity of the producer is received from the producer application. The funds for the targeted payment amount are released to the producer.

In an aspect combinable with any of the general implementations, the operations further include persisting, in an identity permissioned distributed ledger, a record of the verification of the identity of the producer, the identity permissioned distributed ledger storing identity data elements for verified participants of the supply chain. The identity data elements including the a public key for each of the verified participants of the supply chain.

In another aspect combinable with any of the previous aspects, the verification of the identity of the producer is based on matching biometric data collected from the producer and against an identity attestation digitally signed by an identity provider and the producer, the signed identity attestation persisted as a record in the identity permissioned distributed ledger.

In another aspect combinable with any of the previous aspects, the payment data is digitally signed by the purchaser, and wherein the method comprises verifying the signature of the purchaser.

In another aspect combinable with any of the previous aspects, the operations further include receiving, through the producer application, a receipt attestation digitally signed by producer, and before releasing funds for the targeted payment amount to the producer, verifying the signature of the producer.

In another aspect combinable with any of the previous aspects, the operations further include before receiving the payment data, providing a producer attestation comprising proof of sustainable agricultural practices employed by the producer of the purchased goods to the consumer application, wherein the producer attestation is persisted on the permissioned distributed ledger as one of the verified transactions, and wherein the producer attestation is located based on the product identifier.

In another aspect combinable with any of the previous aspects, the proof of sustainable agricultural practices includes photographs, logs, or records of methods used to collect or produce the purchased goods.

In another aspect combinable with any of the previous aspects, the attestation indicates that the producer has been biometrically verified and that the purchased goods were delivered by the producer to a logistics company participating in the supply chain.

In another aspect combinable with any of the previous aspects, a transaction for delivery of the purchased goods to a retailer wherein the purchased goods were sold to the purchaser is persisted in the permissioned distributed ledger.

In another aspect combinable with any of the previous aspects, the purchased goods are employed in a manufacturing of a product, and wherein the purchaser purchases the product.

Implementations include a system with incentive structures deployed using a global service network architecture. The system provides for proof of sustainability by enabling demonstrable proof of where a product originated across the products lifecycle within a supply chain. The system provides for financial inclusion by providing individual producers with direct income, supports responsible small businesses, and enables responsible, small businesses to be supported directly by the individuals who buy their products. The system also provides for an ability to track and rate the implementations of sustainable agriculture practices by producers.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1A:
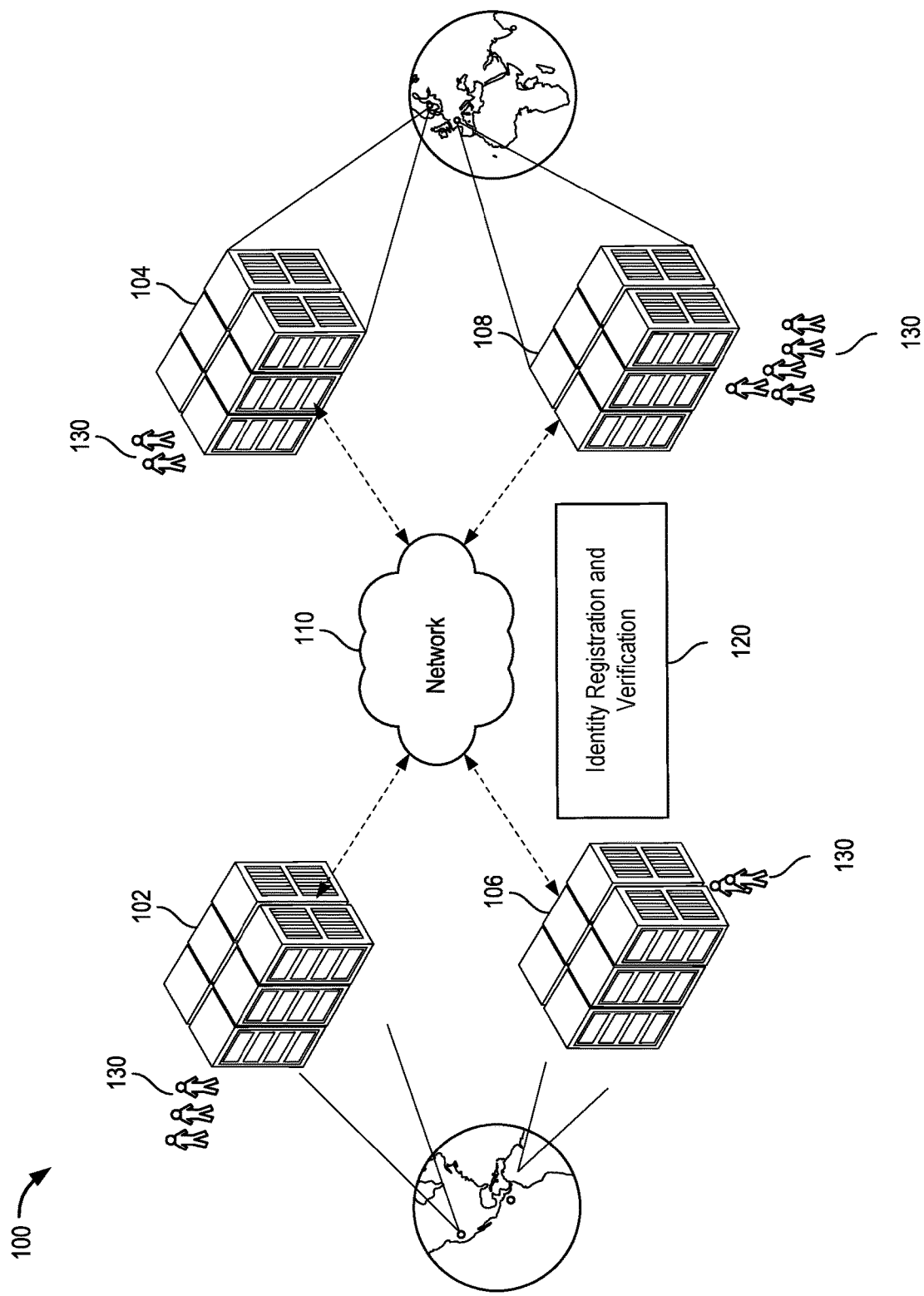
FIGS. 1A-1B depict a global service network architecture in which the provision of services to individuals may require verification of personal identities.

Implementations of the present disclosure are generally directed to a system with incentive structures to promote sustainable practices within, for example, a supply chain. More particularly, implementations of the present disclosure are directed to persisting transactions in a supply chain to a permissioned distributed ledger. The system enables consumers (e.g., purchasers) of goods to verify the sustainable practices employed by the producer of the goods and to provide a mechanism for the consumers to provide incentives, such as a monetary incentive (e.g., a targeted payment or tip), directly to the producer.

To provide context for implementations of the present disclosure, the described system can be employed within a supply chain. In some implementations, producers of goods, such as farmers, provide proof of actions to suppliers, such as a consumer goods company. The information is made available to the end consumers through the described system. As sustainability becomes top-of-mind for consumers, consumer-goods companies are incentivized to sustainably produce goods and thus are looking to minimize their environmental impact. Making this vision a reality, however, becomes challenging when considering the producers (e.g., farmers) at the beginning of the supply chain because the producer who sells his goods to the suppliers, is incentivized to act in the opposite way i.e., in a way that hinders sustainability (e.g., clearing just a little more forest to make way for more farms, and more profit). Moreover, neither the consumers nor the consumer goods companies that supply the goods have full transparency to the supply chain or the provenance of the goods nor the ability to influence the behavior of those that are closest to the ground (i.e., beginning of the supply chain).

One aspect to promoting sustainable practices is to change incentive structures. For example, sustainability can become a larger part of a producer's path to profit. For example, if consumers can directly reward a producer for certain behaviors and practices, then incentives become aligned. A producer reaps the rewards of supporting the end consumer's goals. Suppliers also need a mechanism to reliably know that a producer has indeed produced goods (e.g., crops) in a sustainable way in order to see evidence of his or her behavior. Tapping into the security of blockchain and biometrics, payments can be augmented with verifiable attestations of the producer's identity and a secure ledger containing proof of actions.

An example distributed ledger is the commonly known Blockchain (or blockchain). Blockchain is referenced within the present disclosure for purposes of illustration. It is contemplated, however, that any appropriate distributed ledger can be used in implementations of the present disclosure. A blockchain is a (e.g., public) ledger of transactions that have been executed in one or more contexts (e.g., negotiable instrument transactions, digital currency transactions, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, and so forth) to validate a requested transaction, entities must agree on which transactions have actually occurred, and in which order. For example, if two entities observe different transaction histories, they will be unable to come to the same conclusion regarding the validity of a transaction. The blockchain enables the entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

A private blockchain network may require, for example, an invitation and must be validated by either the network starter or by a set of rules put in place by the network starter. Entities that set up a private blockchain, will generally set up a permissioned network. Such a network places restrictions on who is allowed to participate in the network, and/or the data to which each entities is allowed access. For example, participants is a permissioned network need to obtain an invitation or permission to join. The access control mechanism may vary. For example, existing participants may decide future entrants, a regulatory authority may issue licenses for participation or a consortium could make the decisions instead. Once an entity has joined the network, it may then play a role in maintaining the blockchain in a decentralized manner.

In some implementations, validation of transactions stored to a blockchain includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once). The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

As described above, authenticity of data elements (including transactions of many different types) recorded or inserted by participants into a blockchain may be facilitated through digital signatures. These digital signatures may be based on asymmetric encryption techniques, such as public/private key infrastructure. The data elements recorded in the blockchain, while being nearly unforgeable and unalterable, remain accessible to all participants of the blockchain through their blockchain nodes. In particular, each participant, not necessarily a trusted entity, may decrypt and access any data element in the blockchain using a public key of the party who has digitally signed the data element and inserted it into the blockchain. Traditional blockchain technology may not inherently provide privacy with respect to the recorded data elements. In reality, some data that is suitable for protection by the permissioned distributed ledger is sensitive and/or private. As described in the European Patent Application No. 17306091.4 (Appendix A), for those types of data and related applications, an enhanced or permissioned distributed ledger(s) may be employed within the described system. Such a ledger(s) provides technical solutions for recording and verifying personal identities as well as transaction within a supply chain.

In view of the foregoing, and as described in further detail herein, implementations of the present disclosure provide a system with incentive structures to promote sustainable practices within, for example, a supply chain. In some implementations, the described system combines a distributed ledger implemented for a supply chain with advanced payment technologies and the permissioned and identity mechanisms as described above. The described system may be applied up the supply chain to enable producers to provide proof of actions to suppliers, who may then pass the information on to consumers. By tracking and ensuring that the producers are incentivized to behave in an environmentally sustainable way, sustainable practices can be actively promoted within the respective supply chain. Through the described system, consumers can, for example, directly reward a producer for certain behaviors and practices to align incentives between them.

FIG. 1A depicts a global service network architecture 100 in which the provision of services to individuals, such as producers, suppliers, and consumers in a supply chain, may require verification of personal identities. Connected through the global network architecture 100 are service platforms 102-108. Service platforms 102-108 provide a range of identity-based services ("services") to individuals 130. As examples, the services may include identity registration and renewal services by certified authorities (acting as identity providers) or suppliers in a supply chain (e.g., a consumer goods company). Rendering of services provided by the service platforms 102-108 may involve identity registration and/or identity verification 120 of the individuals 130. The service platforms 102-108 may be located in any geographic region (e.g., the United States, Europe, or Asia). The service platforms 102-108 may be connected through one or more networks 110.

The networks 110 may include private and public networks defined, for example, over a pre-determined and/or dynamic internet protocol (IP) address ranges. In some implementations, the network 110 includes a local area network (LAN), wide area network (WAN), the Internet, or a combination thereof, and connects service platforms 102-108. In some implementations, the network 110 can be accessed over a wired and/or a wireless communications link. For example, mobile computing devices can use a cellular network to access the network 110.

In the depicted example, the service platforms 102-108 may be hosted on one or more back-end systems. Such back-end systems may include at least one server system and a data store. A server system may host one or more computer-implemented services, such as service platforms 102-108, that individuals 130 can interact with using computing devices. For example, computing devices that are used by respective individuals 130 to engage with the service platforms 102-108. In some implementations, the service platforms 102-108 are hosted on a back-end system that includes computer systems using clustered computers and components to act as a single pool of seamless resources when accessed through the network 110. For example, such implementations may be used in data center, cloud computing, storage area network (SAN), and network attached storage (NAS) applications. In some implementations, the service platforms 102-108 are hosted on a back-end system deployed using a virtual machine(s).

The individuals 130 may use computing devices to engage with the service platforms 102-108. These computing devices may include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. It is contemplated, however, that implementations of the present disclosure can be realized with any of the appropriate computing devices, such as those mentioned previously.

Figure 1B:
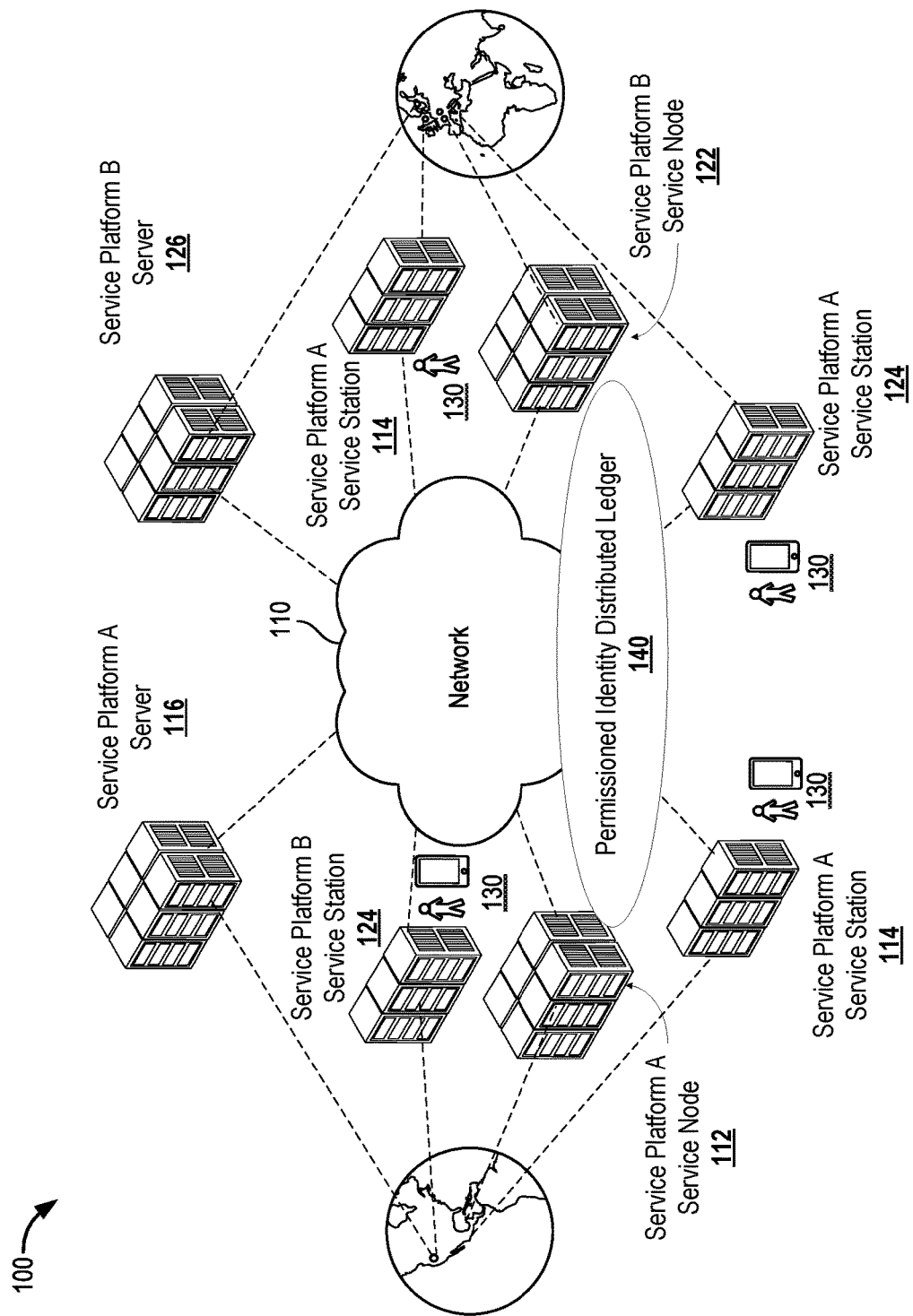

As an example implementation, FIG. 1B depicts the global service network architecture 100 with specific service platforms A and B connected through the networks 110. Service platform A and service platform B may each include one or more service nodes (112 and 122 respectively), one or more service stations (e.g., service stations 114 and 124 respectively), and one or more servers (e.g., servers 116 and 126 respectively). The servers 110 and 120, the service stations 114 and 124, and the service nodes 112 and 122 may be centralized or distributed in any geographic region. The distributed servers, service stations, and service nodes of the service platforms A or B may be connected through private or virtual private networks as part of the networks 110. In some implementations, the service stations 114 and 124 provide interfaces for an individual 130 to obtain services from the service platforms A and B. For example, the service stations 114 and 124 may be employed to collect biometric data from the individuals 130. The servers 110 and 120 provide processing, storage, identity verification, and other functions needed before, during, and after provision of the services. In some implementations, the service nodes 112 and 122 form a global identity verification system among the service platforms. The global identity verification system 140 may be based on a permissioned distributed ledger (e.g., a blockchain) 140. Accordingly, the service nodes 112 and/or 122 may be implemented as nodes of the permissioned distributed ledger 140.

In some implementations, access to the permissioned distributed ledger 140 may be limited only to service providers of service platforms, such as service platforms A and B, having pre-established trust, unlike a traditional public and non-trusted distributed ledger that allows any entity to participate without certification and relies purely on the consensus mechanisms implemented in the distributed ledger for trust. In some implementations, these service providers may be pre-certified and participate in the permissioned distributed ledger 140 at various predefined levels of trust. For example, a certified service provider may participate in the distributed ledger 140 through a ledger node (See FIG. 3). Such ledger nodes of different trust levels may be configured with corresponding predefined functionalities for accessing the permissioned distributed ledger 140. For example, a node of higher trust level may be permitted to both read from and write to the permissioned distributed ledger 140, while a node of lower trust level may be only permitted to read from the permissioned distributed ledger 140.

Figure 2:
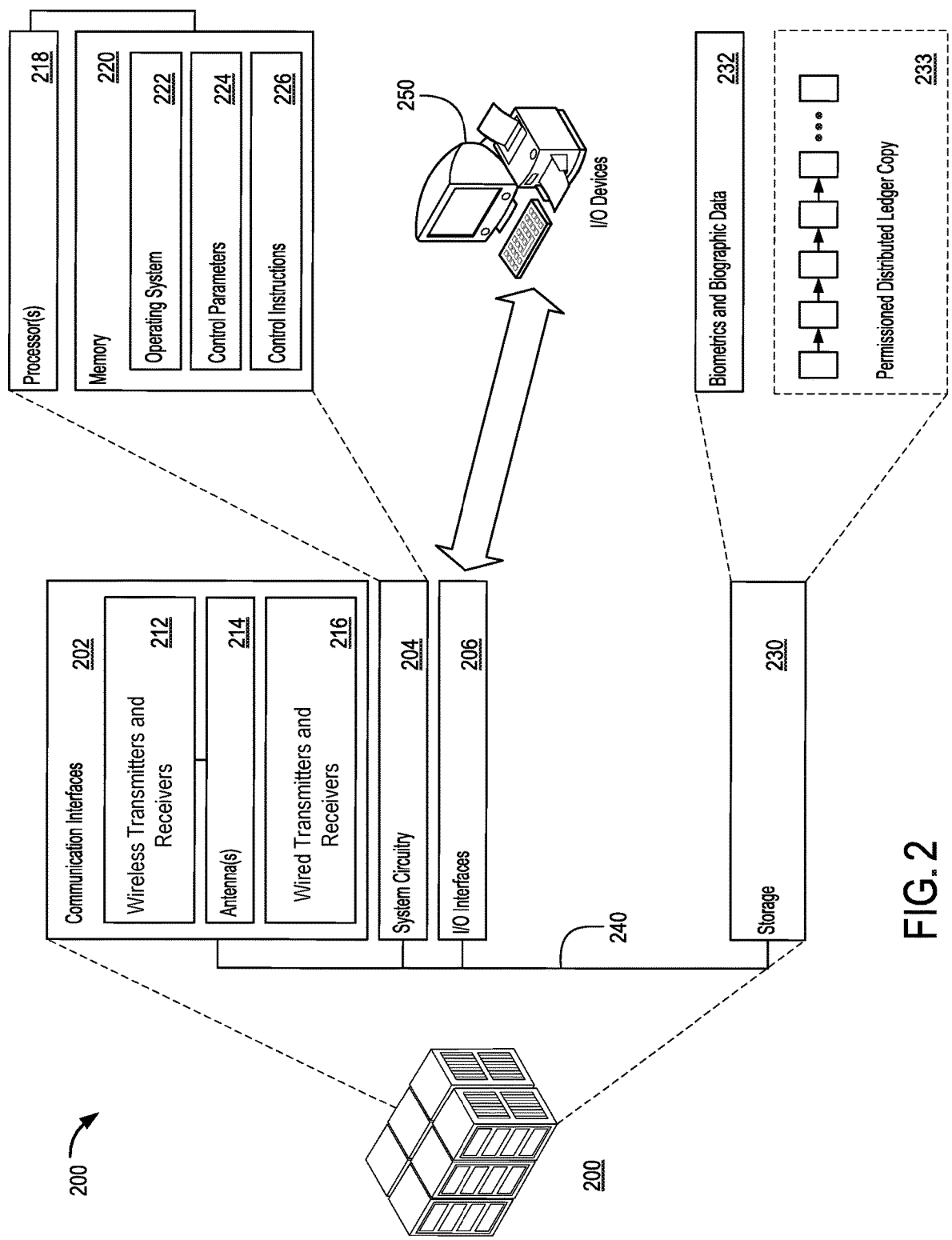
FIG. 2 depicts an example computing system according to implementations of the present disclosure.

FIG. 2 depicts an example computing system 200, according to implementations of the present disclosure. The computing system 200 may be used for any of the operations described with respect to the various implementations discussed herein. For example, the computing system 200 may be included, at least in part, in one or more of the computing device(s) or system(s) described herein, such as the service nodes 112 and 122, the service stations 114 and 124, and the servers 116 and 126 depicted in FIG. 1B. The computing system 200 may include communication interfaces 202, system circuitry 204, one or more input/output (I/O) interfaces 206, and storage 230. The various components 202, 204, 206, or 230 may be interconnected through at least one system bus 240, which may enable the transfer of data between the various modules and components of the computing system 200.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality related to the provision of services and registration, renewal, authentication, and verification of identities. As an example, the system circuitry 204 may include one or more instruction processor(s) 218 and memory 220.

The memory 220 stores, for example, control instructions 224 and/or an operating system 222. In some implementations, the instruction processor(s) 218 executes the control instructions 224 and the operating system 222 to carry out any desired functionality related to the provision of services and registration, renewal, authentication, and verification of identities. The control parameters 224 provide and specify configuration and operating options for the control instructions 226, operating system 222, and other functionality of the computing system 200.

The processor(s) 218 may include single-threaded processor(s), multi-threaded processor(s), or both. The processor(s) 218 may be configured to process instructions stored in the memory 220 or on the storage 230. For example, the processor(s) 218 may execute instructions for the various software module(s) described herein. The processor(s) 218 may include hardware-based processor(s) each including one or more cores. The processor(s) 218 may include general-purpose processor(s), special purpose processor(s), or both.

The memory 220 may store information within the computing system 200. In some implementations, the memory 220 includes one or more computer-readable media. The memory 220 may include any number of volatile memory units, any number of non-volatile memory units, or both volatile and non-volatile memory units. The memory 220 may include read-only memory (ROM), random access memory (RAM), or both. In some examples, the memory 220 may be employed as active or physical memory by one or more executing software modules.

The storage 230 may be used to, for example, store various initial, intermediate, and/or final data for the provision of services and registration, renewal, authentication, and/or verification of identities in computing system 200. Biographic, biometric data, and corresponding identity information 232 for individuals, such as individuals 130, may be maintained in storage 230. The storage device(s) 230 may be configured to provide (e.g., persistent) mass storage for the computing system 200. In some implementations, the storage 230 may include one or more computer-readable media. For example, the storage 230 may include a floppy disk device, a hard disk device, an optical disk device, or a tape device. The storage 230 may include ROM, RAM, or both. The storage 230 may include one or more of an internal hard drive, an external hard drive, or a removable drive.

As an example, the computing system 200 may be employed for implementing servers, service nodes, and/or for providing registration and renewal of identities. When employed as service nodes, such as the nodes 112 and 122 of FIG. 1B, copies 233 of a permissioned distributed ledger may be stored in storage 230.

One or both of the memory 220 or the storage device(s) 230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the computing system 200. In some implementations, the CRSM may include a data store that provides storage of computer-readable instructions or other information in a non-transitory format. The CRSM may be incorporated into the computing system 200 or may be external with respect to the computing system 200. The CRSM may include ROM, RAM, or both. One or more CRSM suitable for tangibly embodying computer program instructions and data may include any type of non-volatile memory, including but not limited to: semiconductor memory devices, such as erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. In some examples, the processor(s) 218 and the memory 220 may be supplemented by, or incorporated into, one or more ASICs.

The computing system 200 may include one or more I/O devices 250. The I/O device(s) 250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 250 may also include one or more output devices, such as a display, light-emitting diodes (LEDs) display, an audio output device (e.g., a speaker), a printer, a haptic output device, and so forth. The I/O device(s) 250 may be physically incorporated in one or more computing devices of the computing system 200, or may be external with respect to one or more computing devices of the computing system 200.

The one or more I/O interfaces 206 enable components or modules of the computing system 200 to control, interface with, or otherwise communicate with the I/O device(s) 250. The I/O interface(s) 206 may enable information to be transferred in or out of the computing system 200, or between components of the computing system 200, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some examples, the I/O interface(s) 206 may be configured to provide a serial connection that is compliant with a version of the IEEE 1394 standard.

In some implementations, the communication interfaces 202 enable communications between computing devices in the computing system 200, or between the computing system 200 and other network-connected computing systems. The communication interfaces 202 may include one or more network interface controllers (NICs) or other types of transceiver devices configured to send and receive communications over one or more communication networks using any network protocol. For example, the communication interfaces 202 may facilitate connection to the network 110 (of FIGS. 1A and 1B) and may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of Institute of Electrical and Electronics Engineers (IEEE) 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

Computing devices of the computing system 200 may communicate with one another, or with other computing devices, using one or more communication networks, such as network 110 of FIGS. 1A and 1B. Such communication networks may include public networks such as the internet, private networks such as an institutional or personal intranet, or any combination of private and public networks. The communication networks may include any type of wired or wireless network, including but not limited to a LAN, a WAN, a wireless WAN (WWANs), a wireless LAN (WLAN), a mobile communications network (e.g., third generation (3G), fourth generations (4G), and Edge), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The computing system 200 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, an SoC, a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Figure 3:
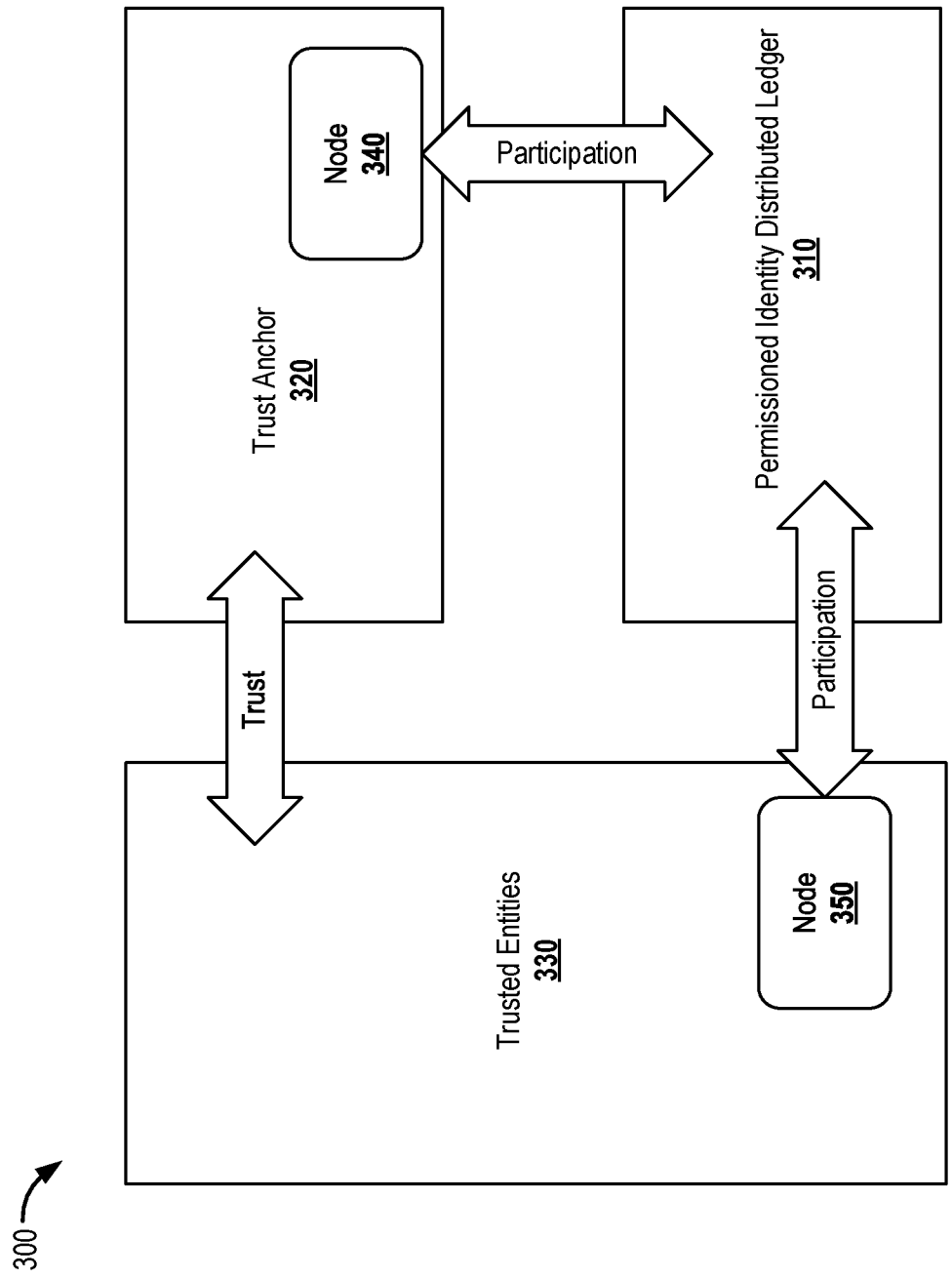
FIG. 3 depicts an example architecture that provides a permissioned distributed ledger to a system employed in global service network architecture.

FIG. 3 depicts an example architecture 300 that provides a permissioned distributed ledger 310 to a system, such as the system employed in global service network architecture 100 of FIGS. 1A and 1B. As described above, participating entities in the permissioned distributed ledger 310 may include trusted parties that may be allowed to access data elements that are of sensitive and/or private in nature stored on the permissioned distributed ledger 310. In some implementations, the trust may be pre-established or pre-certified by a trust anchor 320. In some implementations, only pre-certified entities 130 may participate in the permissioned distributed ledger 310 and thus have access to the data elements recorded in the permissioned distributed ledger 310. In some implementations, the trust anchor 320 and the pre-certified entities 330 may participate in the permissioned distributed ledger 310 through corresponding ledger nodes 340 and 350 respectively.

The trusted parties may be pre-certified with various levels of trust. For example, each level of trust may be associated with a predefined set of access privileges, which may include any combination of read, write, and other access rights. Entities with higher trust levels may, for example, have both read and write privileges and entities with lower levels of trust, however, may only have read privilege. These access privileges may be enforced, for example, through smart contracts to easing key backups and/or recovery with respect to the data elements in the permissioned distributed ledger 310. In some implementations, the permissioned ledger nodes 340 is configured according to the level of trust associated with the corresponding trusted entities.

In some implementations, the certification and management of trusted entities 330 by the trust anchor 320 may be realized independent of the permissioned distributed ledger 310 itself. For example, to become a participant of the permissioned distributed ledger 310 an entity may first establish trust within the permissioned distributed ledger 310 through the trust anchor 320 based on a predefined registration, a certification process, and/or rules implemented through of the permissioned distributed ledger 310. The different levels of trust on the permissioned distributed ledger 310 may be determined by, for example, the rules of a consortium of the permissioned distributed ledger 310, and may be handled by a trust management application. In some implementations, there may be multiple trust anchors for the permissioned distributed ledger 310.

The permissioned distributed ledger 310 may be used to maintain data elements that are sensitive and/or of a private nature and should be only accessible by trusted entities. As an example, the permissioned distributed ledger 310 may be employed to manage personal identities. Personal identities are a foundation for various social and economic activities. Many services provided by entities, such as governmental agencies and financial institutions, require identity verification. Personal identification issued by governmental authorities is traditionally provisioned based on physical documents (e.g., driver licenses, passports, and other forms of portable identifications). Verification of personal identities thus involves at least two aspects. In the first aspect, the authenticity of the physical identity documents is examined and verified (e.g., a passport is authenticate in that it is issued by a legitimate authority). In the second aspect, linkage between physical identity documents and the individuals holding the documents is verified. The traditional infrastructure of physical identities may be problematic because both verification aspects above may be easily compromised. For example, physical identity documents may be easily falsified, altered or tampered with, evading detection. Further, human verification of linkage between a physical identity document and the person holding it based on, for example, a photograph identity document, may be inaccurate.

Figure 4:
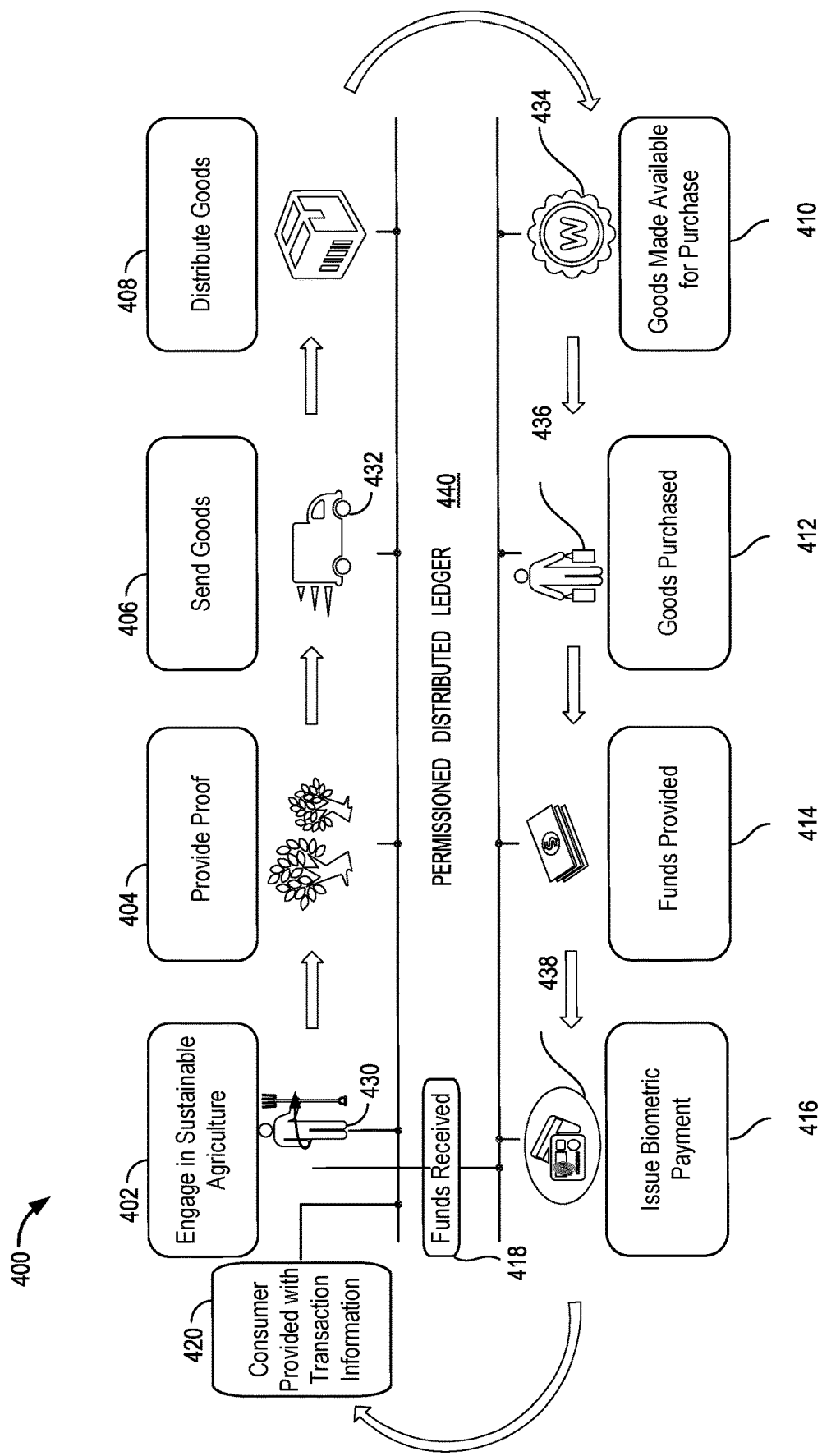
FIG. 4 depicts an example supply-chain environment that can be employed to execute implementations of the present disclosure.

The permissioned distributed ledger 310 may be employed to store personal identity indexes, allowing certified trusted parties providing various social, economic, and other services, to verify authenticity of electronic personal identities carried in a portable electronic device (analogous to a passport). The trust anchor 320 in such an application may be an entity that creates, tracks, and/or updates personal identities (e.g., an identity provider) in addition to managing certification of trusted entities 330. Conversely, an identity provider and a trust anchor 320 may be separate entities. In some implementations, there may be multiple identity providers. Additionally, biometrics of individuals, such as the participants in a supply chain as depicted in FIG. 4, may be captured and maintained by an identity provider and, for services requiring a high-level of security, the linkage between the electronic personal identities and the individuals holding it may be further verified based on biometric matching.

The participating nodes of the permissioned distributed ledger 310 (and 140) may each store a copy of the permissioned distributed ledger 310. Each copy includes linked data blocks of data elements. In some implementations, such data elements are added to the permissioned distributed ledger 310 by participating nodes with write permission. Each data element may be associated with an index (e.g., an identifier, a block index, a block identifier, a data element index, or a data element identifier) for identifying the data element in the permissioned distributed ledger 310. As such, the permissioned distributed ledger 310 may be queried for specific data elements without having to traverse the entire linked data blocks. The data elements added by the permissioned distributed ledger nodes, such as 340 and 350, may be transactions related to personal identities. For example, a data element may be an identity index for an individual, or may be a transaction that invalidates an earlier obsolete identity index (e.g., an earlier identity index that has been renewed or updated and is thus rendered obsolete). The format and contents of the data elements in the permissioned distributed ledger 310 may be predefined with one example implementation discussed in detail below.

Authenticity of the data elements in each data block of the permissioned distributed ledger 310 may be achieved using cryptographic technologies. For example, a digital signature based on public and private key cryptography may be used to ensure that a data element to be inserted into the distributed ledger 310 is signed by and originates from its proclaimed submitting entity. In particular, each entity participating in the distributed ledger 310 who wishes to store data elements in the distributed ledger 310 may be in possession of a private key that is kept secret at all times (e.g., managed by a Hardware Secured Module (HSM)). A public key associated with the private key (e.g., mathematically) may be derived from the private key and may be made publicly available (e.g., managed by a Public Key Infrastructure (PKI)). When a participating entity wishes to store a data element in the permissioned distributed ledger 310, the entity may first digitally sign the data element using its private key before the data is submitted for insertion in the permissioned distributed ledger 310. The signed data element may be decrypted by anyone having access to the permissioned distributed ledger 310 and the public key of that entity. Any tampering of the signed data will result in unreadable data when being decrypted using the public key. As such, signing using the private key represents a digital signature of the data element by the entity and any tampering of the signed data is detected.

The trusted anchor 320 and trusted entities 330 participating in the permissioned distributed ledger 310 may be each be associated with a set of private and public keys. The private keys may be used by the participating entities to sign data elements to be inserted into the permissioned distributed ledger 310. The public keys may be used by others to decrypt data elements inserted into the permissioned distributed ledger 310. For example, the trusted anchor 320 may submit a data element associated with the identity index of a particular individual into the permissioned distributed ledger 310 by signing the data element with its private key. Other certified trusted entities 330 may locate the data element in the permissioned distributed ledger 310 using a data element identifier for the data element and decrypt the data element using the known public key of the trusted anchor 320 during for example, the process of conducting identity verification.

The permissioned distributed ledger 310 may further implement other functionalities for detecting tampering of the recorded data elements. As such, the data elements inserted into the permissioned distributed ledger 310 may be protected from being altered at a later time. The International Patent Application No. PCT/CN2017/083597 filed with the State Intellectual Property Office of China on May 9, 2017 by the same Applicant provides a detailed description of these functionalities. In addition, a consensus mechanism may be implemented among the participating ledger nodes, such as ledger nodes 340 and 350, to prevent any of the participating nodes from inserting uncertified or unauthorized identity index data elements.

FIG. 4 depicts an example supply-chain environment 400 that can be employed to execute implementations of the present disclosure. The example environment 400 includes at least one permissioned distributed ledger 440, such as described in FIGS. 1-3. The permissioned distributed ledger 440 is accessed by participants in the depicted supply-chain environment 400. These participants may include a producer (e.g., a farmer) 430, a logistics company 432, a local supplier/retailer 434, and a consumer 436. The example supply-chain environment 400 provides for the transparency and traceability to small producers of goods as well as for the proof of provenance and the ability for the consumer 436 to identify the producer 430 more directly.

The permissioned distributed ledger 440 may be deployed within the global service network architecture 100 of FIGS. 1A and 1B using the example architecture 300 of FIG. 3. The participants (e.g., 430-436) in the supply chain may be registered with the permissioned distributed ledger 440 as described in detail below with regards to FIGS. 5-9, and as described in the European Patent Application No. 17306091.4 (Appendix A). In some implementations, a supply chain is a network between a company (e.g., the logistics company 432) and its suppliers (e.g., the producer 430) to produce and distribute a specific product. In such implementations, the supply chain represents the steps to provide the product and/or service to the customer.

The producer 430 provides goods to the supply chain. For example, the producer may be a farmer of shrimp or a crop, such a wheat or rice. In such implementations, the logistics company 432 provides management over the flow of goods and materials between points of origin (e.g., from the producer 430) to end-use destination (e.g., local supplier/retailer 434 or the consumer 436). For example, the logistics company 432 may handle shipping, inventory, warehousing, packaging, and security functions for shipments. In some implementations, the logistics company 432 may also manufacture products using the goods received from the producer 430. In such implementations, the logistics company 432 ships the manufactured products to the local supplier/retailer 434 for sale to the consumer 436. In some implementations, local supplier/retailer 434 is a business or person that sells goods to the consumer 434. In some implementations, the consumer 436 is a party that receives (e.g., purchases) or consumes products (e.g., goods or services) and has the ability to choose between different products and suppliers. In some implementations, the permissioned distributed ledger 440 is owned and/or managed by the logistics company 432, the local supplier/retailer 434, or a combination of both. Additionally, a regulator (not shown), such as the World Wildlife Fund (WWF) or Rainforest Alliance, may assist management of the permissioned distributed ledger 440 in partnership with the logistics company 432 and/or the local supplier/retailer 434. In other implementations, such a regulator may own and/or manage the permissioned distributed ledger 440 independently from the other entities servicing the supply chain.

As depicted in FIG. 4, the participants in the depicted supply-chain environment 400 may participate in the supply chain and use the permissioned distributed ledger 440 to assist in the alignment of incentives so that each may engage in a sustainable agriculture process. The producer 430 may committed to and engage (402) in sustainable agriculture. For example, the producer 430 may commit to cut down as little forest as possible, not to over fish, not to kill endangered or protected species, and so forth. The producer may then provide evidence or demonstrate (404) in some manner their participation in such sustainable agriculture. For example, the producer may load pictures depicting the employed farming techniques and/or provide log data regarding this participation to the permissioned distributed ledger 440.

The producer 430 then sends (406) the produced goods up the supply chain to the logistics company 432. For example, once the producer 430 has collected or otherwise obtained a certain number of goods, they are collected by a manufacture (e.g., the logistics/manufacturing company 434) for use in the manufacture of products or by a distributor that ships the goods (along with goods of a similar kind collected from other producers) to various regions. In some implementations, the logistics company 432 provides support for and access to the permissioned distributed ledger 440. The producer 430 may provide various information and evidence about the shipped goods, such as the type of goods, the amount shipped, the methods used to collect or produce the goods, photographs, logs, and so forth, to the permissioned distributed ledger 440.

When the logistics company 432 has a final group of products (e.g., the goods have been manufactured into another product or an amount of goods has been collected from various producers and packaged), it distributes (408) such products to local retailers 434. Information about these shipments, such as the source and an identifier for the producer 430 of the goods in the shipment or the goods used to manufacture the products in the shipment, is added to the permissioned distributed ledger 440.

Once the goods are received, they are made available (410) for purpose by the local supplier/retailer 434. The local supplier/retailer 434 can provide (412) the consumer 436 with information about the goods when the goods are purchased. This information may be stored on the permissioned distributed ledger 440. Through the information stored on and provided by the permissioned distributed ledger 440, the consumer 436 may provide (414) funds (e.g., a targeted payment) the producer 430 through, for example, an application running on a mobile device or accessed through a website. For example, the farming method used to produce a particular food item as well as the traceability of the food item is shown through the information provided by the permissioned distributed ledger 440. In this way, the consumer 436 can provide incentives to the producer 430 directly to encourage behaviors and practices, such as engagement is sustainable agriculture.

Once the targeted payment funds are marked for the producer 430, a payment mechanism that supports biometrics 438 for the producer is issued (416). In some implementations, this payment is added to the permissioned distributed ledger 440. In some implementations, only the producer 430 (or agent) may access these funds given the provided biometric controls. In some examples, the payment mechanism that supports biometrics 438 uses biometric authentication, such as a fingerprint, to identify the user (e.g., the producer 430 or their agent). The funds are received (418) by the producer 430, and the consumer 436 is provided (420) information that the funds have been received by the producer 430. In some implementations, the application used by the consumer 436 may be provided by the logistics company 432 or the local supplier/retailer 434. By employing the permissioned distributed ledger 440 to provide these described transactions, traceability is increased (as each transaction is traceable through the permissioned distributed ledger 440) in the respective supply chain as well as the accountability of the actors within it.

Figure 5:
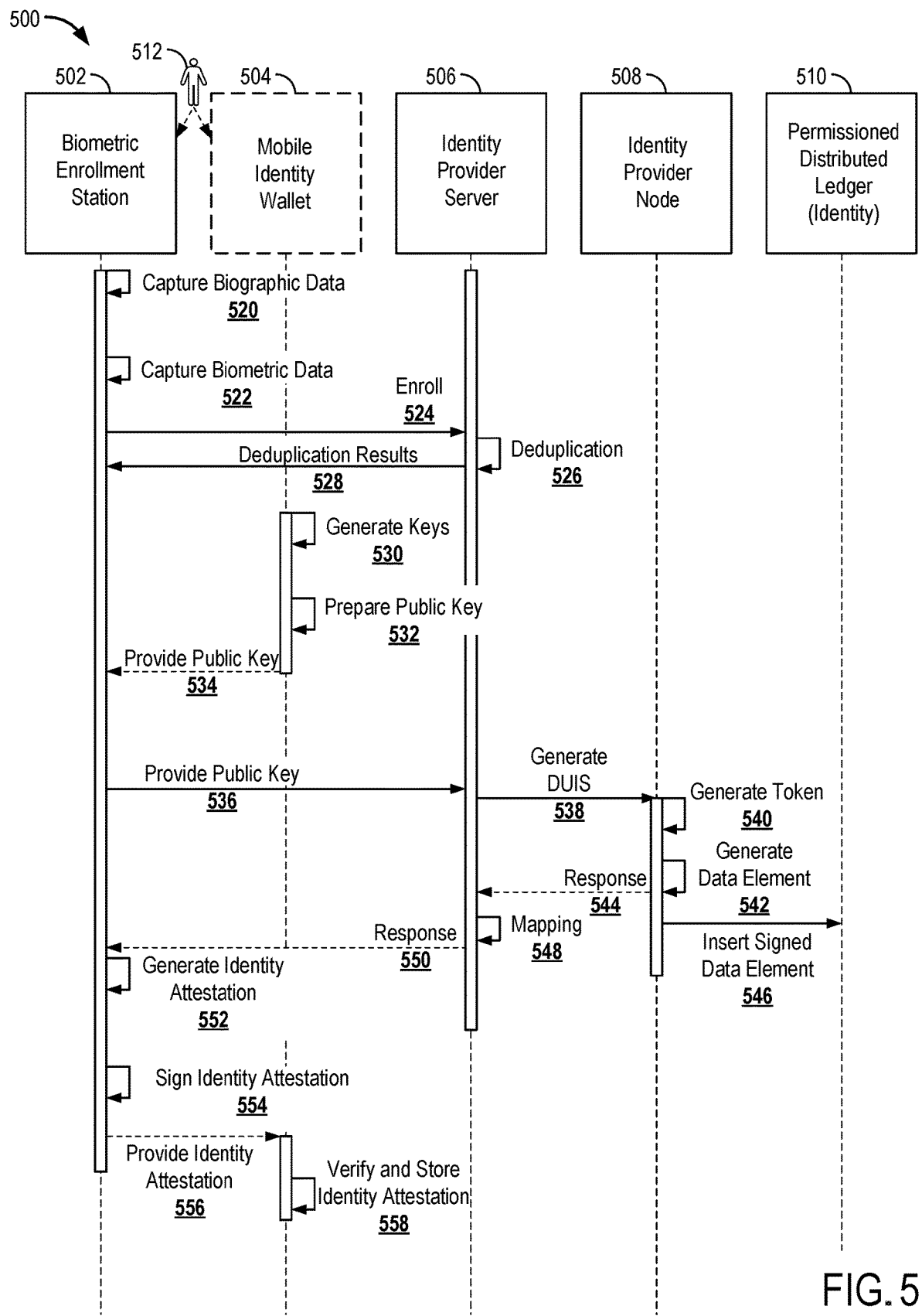
FIG. 5 depicts an exemplary logic flow for enrollment in a permissioned distributed ledger.

FIG. 5 depicts an exemplary logic flow 500 for enrollment in a permissioned distributed ledger 510, such as described in FIGS. 1-4. Logic flow 500 may be implemented within a global service network architecture, such as the global service network architecture 100 of FIG. 1, and employed to enroll participant 512, such as the producer 430 and consumer 434 of FIG. 4, in a permissioned distributed ledger 510. In some implementations, the permissioned distributed ledger 510 includes data regarding verified participants in a supply chain as described above in FIG. 4. In some implementations, entities in the respective supply chain, such as the logistics company 432 and/or the local supplier/retailer 434, may maintain the permissioned distributed ledger 512 and serve as the trust anchor 340, as depicted in FIG. 3. In some implementations, a third-party (e.g., an entity other than the logistics company 432 and/or the local supplier/retailer 434) maintains the permissioned distributed ledger 512 and serve as the trust anchor 340, as depicted in FIG. 3. In such implementations the trust anchor acts as an identity provider for the permissioned distributed ledger 510. In some implementations, an identity provider is an entity that creates, tracks, and updates personal identities in addition to managing certification of the other trusted entities, such as depicted in FIG. 3, for the permissioned distributed ledger 510. The permissioned distributed ledger 510 is referred to as an identity provider permissioned distributed ledger in the description of subsequent figures.

As depicted in FIG. 5, the identity provider may provide functionalities through a service platform deployed through the global service network architecture. The service platform includes a biometric enrollment service station 502, an identity provider server 506, and an identity provider node 508 (see FIG. 1B). The participant 230 may interact with the identity provider through the biometric enrollment service station 502 to obtain various services that require identity verification. The participant 512 may interact with the biometric enrollment service station 502 using, for example, a mobile identity wallet 504. In some implementations, a mobile identity wallet is a portable identity device, such as a mobile phone or smart card. The mobile identity wallet 504 may include applications, such as a standalone application or a web browser, that are employed to communicate with the biometric enrollment service station 502. The mobile identity wallet 504 may store profile data, such as biographic data, and/or a digital identity for the respective participant, analogous to an electronic passport (ePassport). An identity wallet may also generate a public/pair key pair for the participant 512.

The biometric enrollment station captures (520 and 522) biographic (e.g., name, address, and date of birth) and biometric (e.g., fingerprint, facial image, iris image, voice samples, DNA sequences, palm veins, and palm print) from the participant 512. The biometric enrollment service station 502 provides (524) a request for enrollment for participant 512 to the identity provider server 506. In some implementations, the request includes at least a portion of the collected biographic and/or biometric data. The identity provider server 506 performs (526) data deduplication (e.g., eliminating duplicate copies of repeating data) on the received data. The identity provider server 506 provides (528) the deduplication results to the biometric enrollment service station 502.

The mobile identity wallet 504 generates (530) the private/public key pair for the participant 512. The mobile identity wallet 504 prepares (532) and securely provides (534) generated public key to the biometric enrollment service station 502. For example, the mobile identity wallet 504 may employ a Quick Response (QR) code to send the public key to the biometric enrollment service station 502. In such an example, the mobile identity wallet 504 may first prepare (532) a QR graphic based on the public key and provide (534) the QR code to the biometric enrollment service station 502. The QR graphic may be provided using, for example, a QR scanner associated with the biometric enrollment service station 502. Specifically, the QR scanner may read the QR code displayed on the mobile identity wallet 504. The biometric enrollment service station 502 provides (536) the public key to the identity provider server 506 to request generation of a digital unique identification sequence (DUIS) for the participant 512 for the permissioned distributed ledger 510.

The identity provider server 506 creates (538) a DUIS for the participant 512, which is provided to the identity provider node 508. The identity provider node 508 generates (540) a token for the DUIS. Alternatively, the identity provider server 506 may generate the token for the DUIS and provide the token to the identity provider node 508. The identity provider node 508 creates and signs (542), using the private key of the identity provider, a data element (e.g., a blockchain identity) that includes the public key, the token, and a data element identifier. The identity provider node 508 provides (544) the token and the data element identifier to the identity provider server 506 as a response. The identity provider node 508 adds (546) the signed data element into the permissioned distributed ledger 510. The identity provider server 506 maps (548) the token and data element identifier to the corresponding DUIS and stores the mapping. The identity provider server 506 provides (550) a response to the biometric enrollment service station 502 indicating that the DUIS was generated and that the data element was inserted into the permissioned distributed ledger 510.

The biometric enrollment service station 502 generates (552) an identity attestation. In some implementations, the attestation indicates that the participant has been biometrically verified. The biometric enrollment service station 502 signs (554), using the private key of the identity provider, the identity attestation, and the data element identifier. The biometric enrollment service station 502 provides (556), through a secure communication protocol, the signed identity attestation and the data element identifier to the mobile identity wallet 504. The mobile identity wallet 504 verifies and stores (558) the signed identity attestation and the data element identifier, and the logic flow 500 ends.

By employing the logic flow 500, an identity of the participant 512 may be registered and created by the identity provider. The participant 512 is uniquely identified by a DUIS. The public key for the participant 512 and the token generated from the DUIS (the data element) are stored by the identity provider in the permissioned distributed ledger 510. The data element is protected from being altered by the digital signature of the identity provider and the consensus mechanism inherent to the permissioned distributed ledger 510. In some implementations, the captured biometric and/or biographic data, however, is not stored in the permissioned distributed ledger 510 and not directly accessible by the other participants of the permissioned distributed ledger 510. The biometric and/or biographic data is securely stored by the identity provider.

Figure 6:
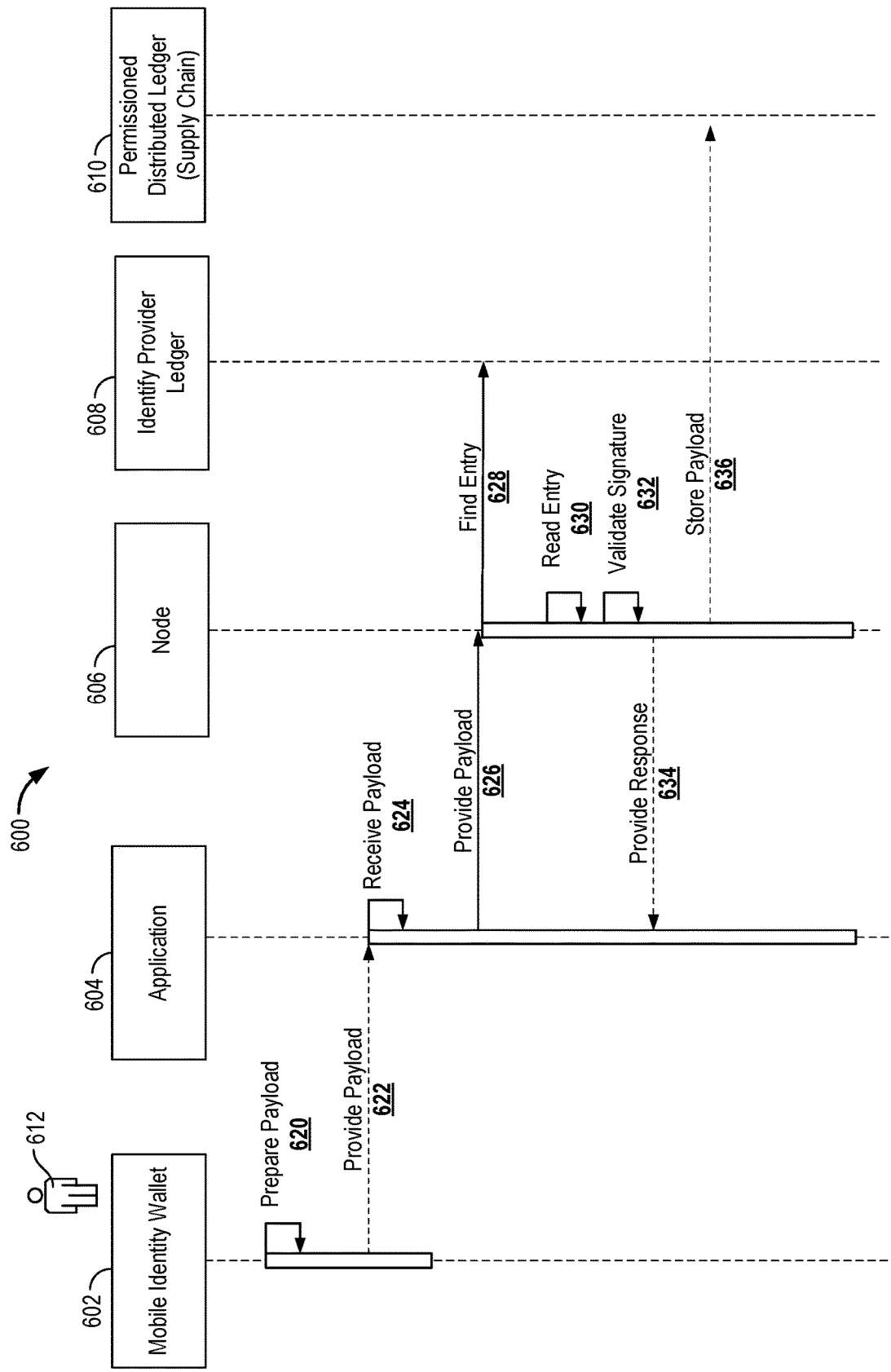
FIGS. 6-8 depict an exemplary logic flow for participants in a supply chain.

FIG. 6 depicts an exemplary logic flow 600 for participant 612 in a supply chain, such as the producer 430 of FIG. 4, to share information through a permissioned distributed ledger 610 generated to store transactions for the supply chain (supply-chain ledger). For example, as depicted in FIG. 4, the producer 420 may provide evidence of their sustainable agriculture practices or information about a shipment provided to the logistics company through the logic flow 600. Logic flow 600 may be implemented within a global service network architecture, such as the global service network architecture 100 of FIG. 1. The permissioned distributed ledger 608 is generated to store data elements for participants, such as the participant 612, of the supply chain that have been verified through, for example, logic flow 500 (identity-provider ledger).

Functionalities for the participant 612 may be provided through a service platform deployed through the global service network architecture. The service platform includes an application 604, and a node 606 (see FIG. 1B). The application 604 provides a communication interface for the participant 612 to access the supply-chain ledger 610 through, for example, an application 602 (e.g., a mobile identity wallet). The node 606 stores and/or retrieves data from the identity-provider ledger 608 and the supply-chain ledger 610. The application 604 and node 606 may be supported by other participants in the supply chain, such as the logistics company 432 and/or the local supplier/retailer 434 of FIG. 4. These participants can also serve as the identity provider or they may be separate entities.

The participant 612 prepares (620) the information (e.g., photos) to provide to the supply-chain ledger 610 using for example the mobile application 602 by signing the payload with the private key for the participant 612 stored in the participant's 612 digital wallet. The payload may include the information, the identity attestation signed by the identity provider and the participant 612, and the data element identifier (either signed by the identity provider or unsigned) for the identity index data element for the participant 612 in the identity-provider ledger 608 (such as described for FIG. 5). The mobile application 602 provides (622) the payload data to the application 604 through, for example, a network.

The application 604 receives (624) the doubly signed attestation and the signed or unsigned data element identifier. The application 604 provides (626) the payload to the node 606 for authentication. The node 606 finds (628) and reads (630) the participant's 612 entry on the identity-provider ledger 608 with the data element identifier. The node 606 then validates (632) the participant 612 signature using the read data element. The node 606 provides (634) a response to the application 604, which may be provided to the mobile application 602 (now shown). The node 606 adds (636) the payload to the supply-chain ledger 610, and the logic flow 600 ends.

Figure 7:
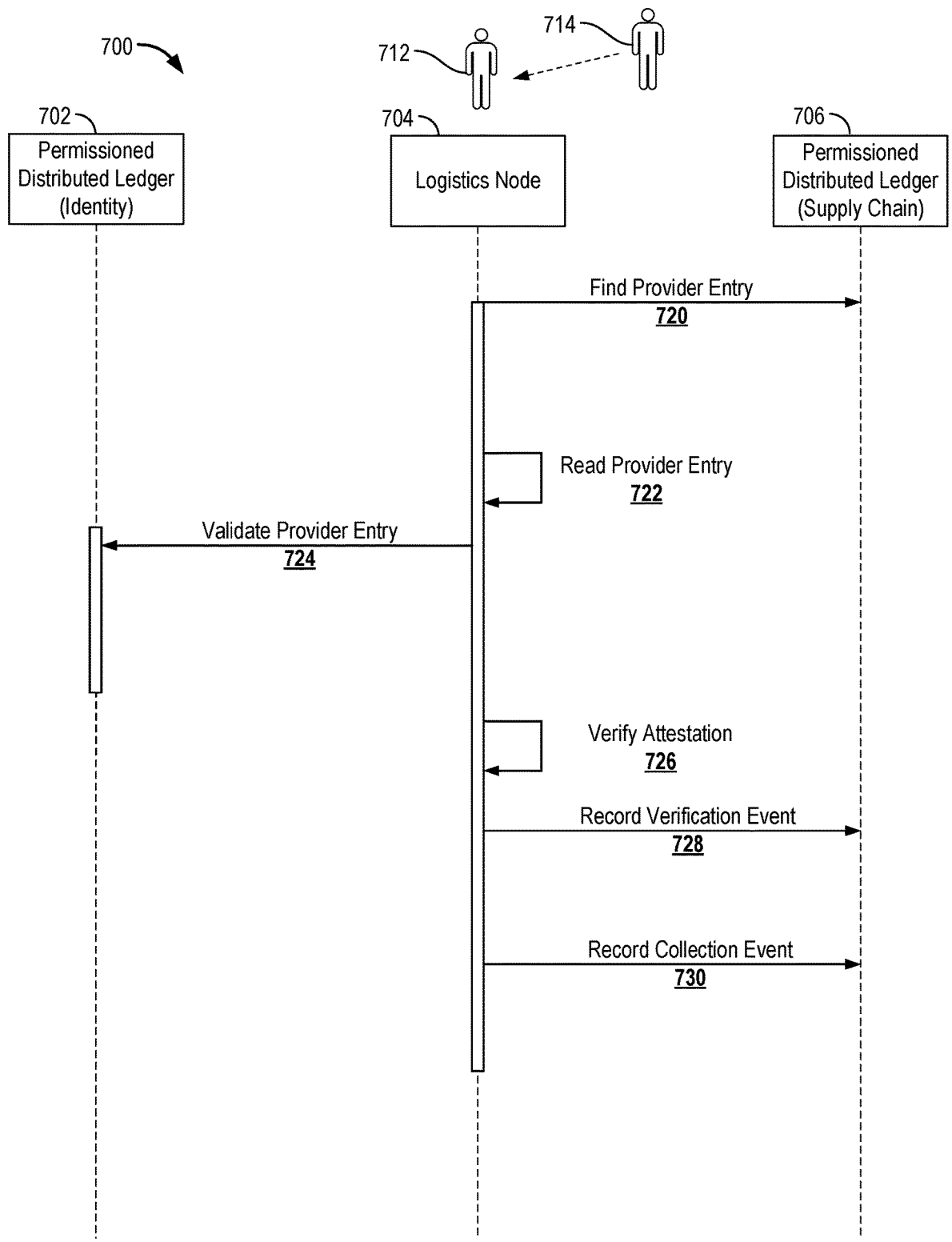

FIG. 7 depicts an exemplary logic flow 700 for participant 712 in a supply chain, such as the logistics company 432 of FIG. 4, to verify and record a collection event, such as receiving goods from a provider 714, such as provider 430 of FIG. 4, in the supply chain. The collection event is recorded in a permissioned distributed ledger 706 generated to store transactions for the supply chain (supply-chain ledger). Logic flow 700 may be implemented within a global service network architecture, such as the global service network architecture 100 of FIG. 1. The permissioned distributed ledger 702 is generated to store data elements for participants, such as the participant 712 and the provider 714, of the supply chain that have been verified through, for example, logic flow 500 (identity-provider ledger). The logistics node 704 may be a part of a service platform deployed through the global service network architecture. The logistics node 704 verifies and records collection events in the supply-chain ledger 706.

The logic flow 700 may be triggered when, for example, the logistic participant 712, receives a shipment of goods from the producer 714. The producer 714 may record information regarding the shipment, such as proved of the sustainable agricultural practices used in or during the production of the goods in the shipment, through a process similar to logic flow 600. The logistics node 704 finds (720) and reads (722) the entry on the supply-chain ledger 706 regarding the shipment. The read information may include a shipment or batch identifier, the identity attestation signed by the identity provider and the producer 714, and the data element identifier (either signed by the identity provider or unsigned) for the identity index data element for the producer 714 in the identity-provider ledger 702 (such as described for FIG. 5). Using the data element identifier for the producer, the logistics node 704 validates (724) the producer's signature with the record stored on the identity-provider ledger 702. The logistics node 704 verifies (726) that the attestation matches the batch identifier. The logistics node 704 records (728 and 730) a signed verification event and a collection event to the supply-chain ledger 706. The verification event indicating that that batch has been verified as from the producer. The collection event may include, for example, information regarding the collection of goods (e.g., the amount and kinds) and indicating that the goods have been received by the participant 712. The logic flow 700 ends.

Figure 8:
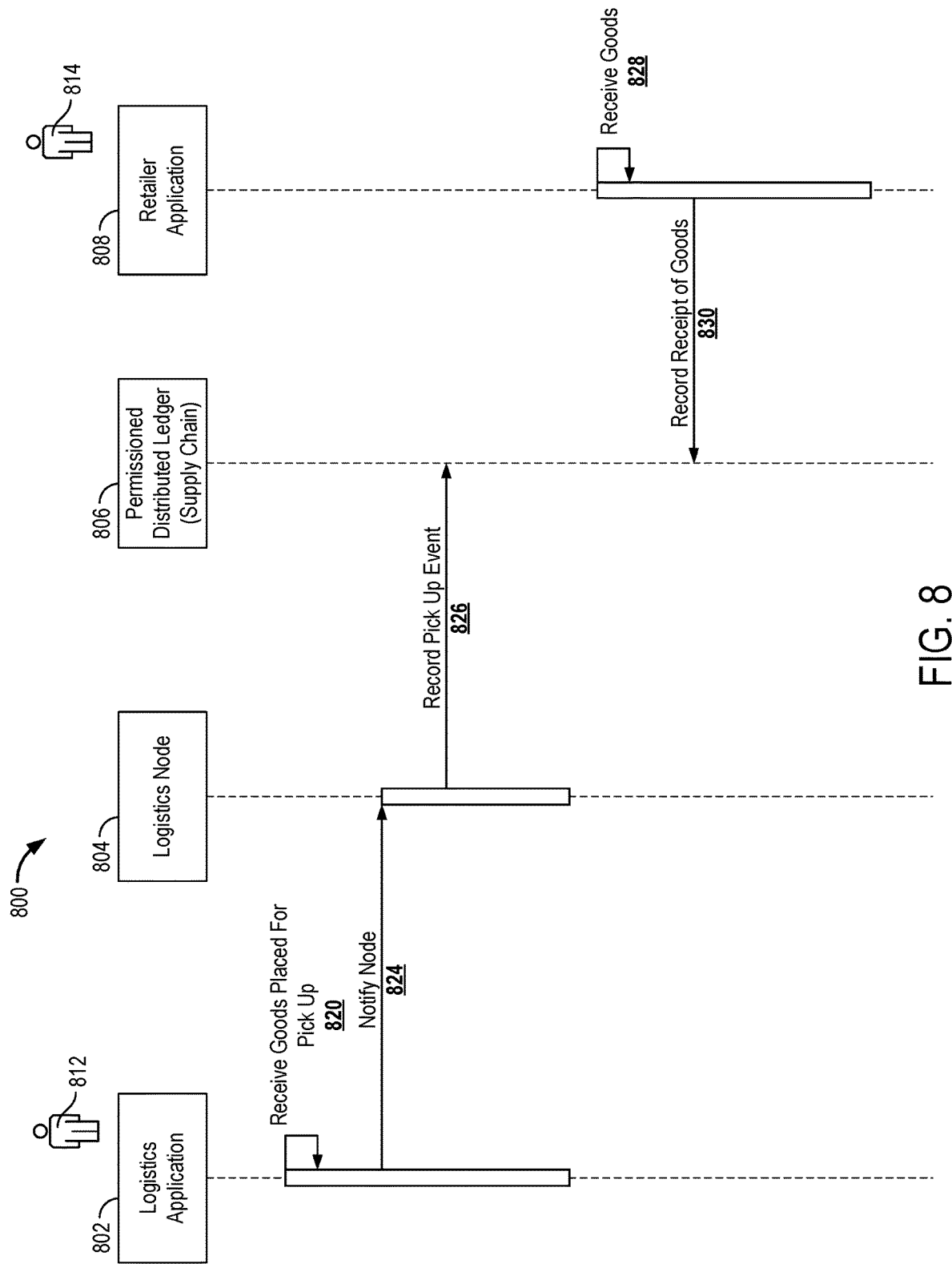

FIG. 8 depicts an exemplary logic flow 800 for participant 812 in a supply chain, such as the logistics company 432 of FIG. 4, to record transaction data regarding the shipment of a product to a receiving participant 814, such as local supplier/retailer 434 of FIG. 4. The transaction data is recorded to a permissioned distributed ledger 806 generated to store transactions for the supply chain (supply-chain ledger). Logic flow 800 may be implemented within a global service network architecture, such as the global service network architecture 100 of FIG. 1. The logistics application 802 and node 804 may be a part of a service platform deployed through the global service network architecture. The retailer application 808 may be a part of another service platform deployed through the global service network architecture. The logistics application 802 may receive and coordinate information regarding products placed for pick up to the receiving participant 814. The logistics node 804 records product for pick up events in the supply-chain ledger 806. The retailer application 808 records pick up events in the supply-chain ledger 806.

The logic flow 800 may be triggered when, for example, the participant 812, for example, places a product for pick up receiving participant 814 through the supply chain. The logistics application 802 receives (820) goods or a product for pick up from, for example, a producer and notifies (824) the logistics node 804. The logistics node 804 records (826) the event in the supply-chain ledger 806.

The retailer application 808 receives (828) a notification that the product has been received from the participant 812 and records (830) the event in the supply-chain ledger 806, and the logic flow 800 ends.

Figure 9A:
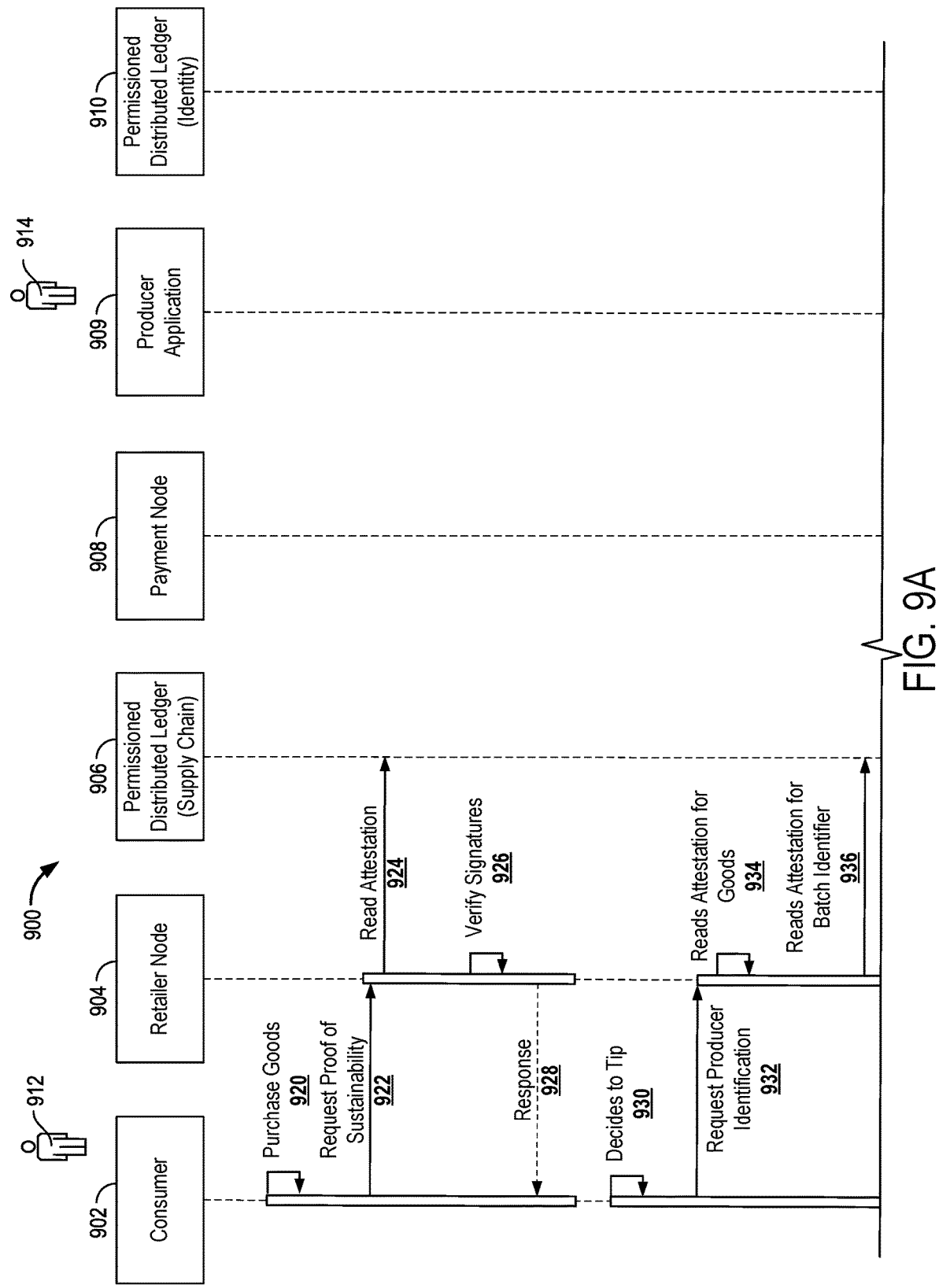
FIGS. 9A-9B depict an exemplary logic flow employing a permissioned distributed ledger for the providing a targeted payment to a producer in a supply chain directly by a consumer in the supply chain.
Figure 9B:
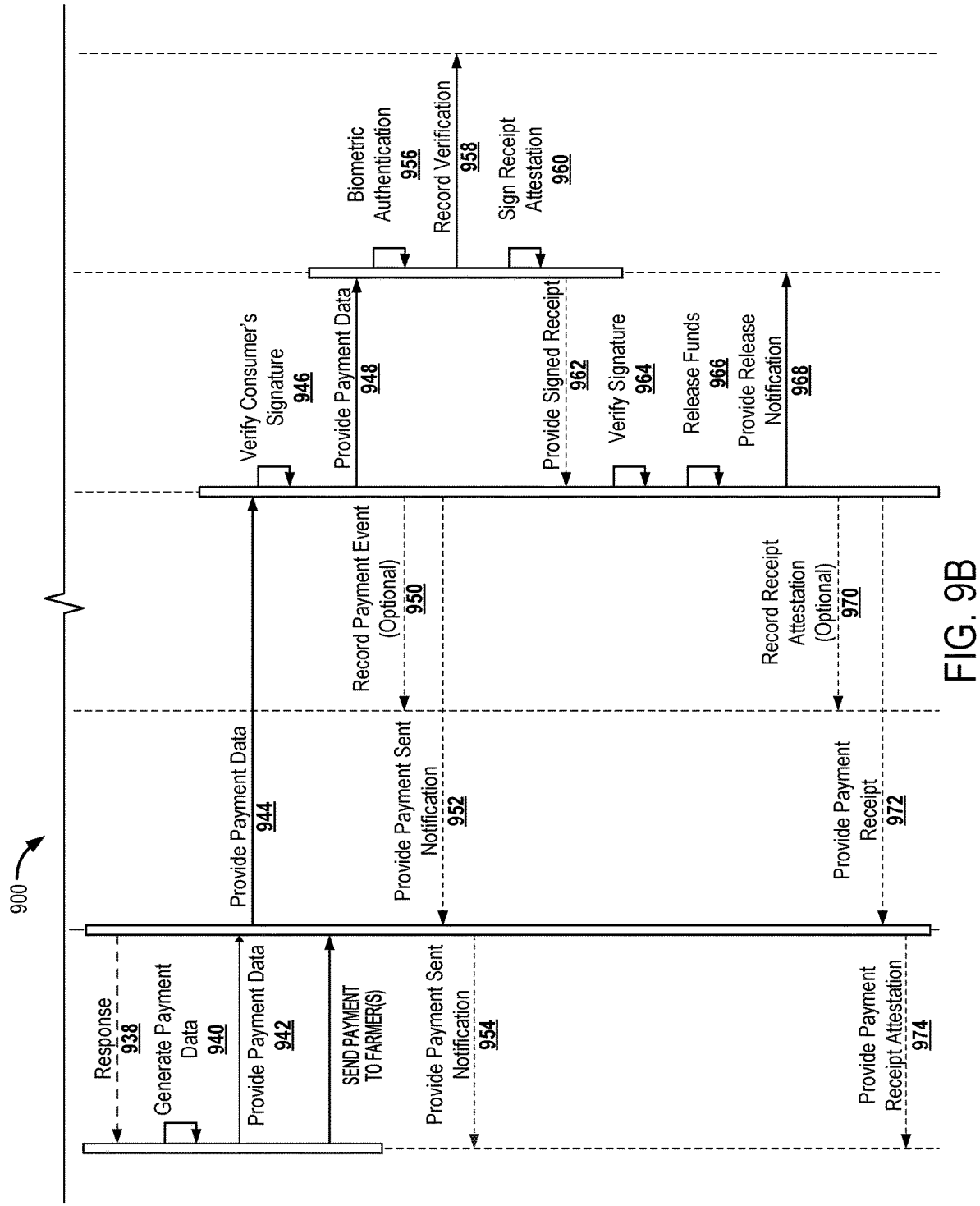

FIGS. 9A-9B depict an exemplary logic flow 900 employing a permissioned distributed ledger 906, such as described in FIGS. 1-4, for the providing a targeted payment to a producer 914 in a supply chain, such as producer 430 of FIG. 4, directly by a consumer 912 in the supply chain, such as consumer 434 of FIG. 4. Logic flow 900 may be implemented within a global service network architecture, such as the global service network architecture 100 of FIGS. 1A-1B. Information regarding, for example, the producer's sustainable agricultural practices as well as the transaction data regarding providing a targeted payment to the producer 914 by the consumer 912 is recorded in the permissioned distributed ledger 906. The permissioned distributed ledger 906 is generated to store, for example, transactions for the supply chain (supply-chain ledger). The permissioned distributed ledger 910 is generated to store data elements for the producer 914 that have been verified through, for example, logic flow 500 (identity-provider ledger).

Functionalities for the consumer 912 and the producer 914 may be provided through a service platform deployed through the global service network architecture. The service platform includes a retailer node 904 and a payment node 908 (See FIG. 1B). The consumer application 902 and the producer application 909 provide communication interfaces for the consumer 912 and the producer 914 respectively. The consumer application 902 allows the consumer 912 to access the supply-chain ledger 906 through the retailer node 904. The producer application 909 allows the producer 914 to access the identity-provider ledger 910 and, through the payment node 908, the supply-chain ledger 906. The retailer node 904 and the payment node 908 store and/or retrieve data from the supply-chain ledger 906. These nodes and applications may be supported by other participants in the supply chain, such as the logistics company 432 and/or the local supplier/retailer 434 of FIG. 4. These participants can also serve as the identity provider or they may be separate entities.

The consumer 912 purchases (920) a product that originated from the goods (either directly or indirectly) from the producer 914. The consumer 912 provides (922) a request for proof of sustainability for the purchased product to the retailer node 904 through the consumer application 902. The retailer node 904 reads (924) the attestation information associated with the product from the supply-chain ledger 906. The retailer node 904 verifies (926) the signature of the attestation. The retailer node 904 provides (928) a response to the consumer application 902 regarding the proof of sustainability for the purchased product.

The consumer 912 decides (930) to send a targeted payment to the producer 914. The consumer 912 provides (932) a request to identify the producer(s) for the purchased product to the retailer node 904 through the consumer application 902. The retailer node 904 reads (934) the attestation for the purchased product and reads (936) the attestation for the batch identifier associated with the product from the supply-chain ledger 906. Such a batch identifier may be associated and stored with the purchased product through, for example the logic flow 700 depicted in FIG. 7. The retailer node 904 provides (938) a response to the consumer application 902 regarding the identity of the producer. In some implementations, this response may not provide details such that the producer 914 may be personally identified by the consumer 912, but rather include details as to how to directly provide the producer 914 with funds.

The consumer 912 generates (940) a payment data and provides (942) the payment data to the retailer node 904 through the consumer application 902. The retailer node 904 provides (944) the payment data to the payment node 908. The payment node 908 verifies (946) the consumer's 912 signature and provides (948) a payment notification to the producer application 909. The payment node 908 optionally records (950) the sending of the payment to the supply-chain ledger 906 and provides (952) a payment sent notification to the retailer node 904, which forwards (954) to the consumer application 902.

The producer application 909 conducts (956) biometric authentication of the producer 914 and records (958) the verification of the producer's identity to the identity-provider ledger 910. The producer 914 signs (960) a payment receipt through the producer application 909, and provides (962) the signed receipt to the payment node 908. The payment node 908 verifies (964) the producers signature, triggers (966) the release of funds to the producer 914, and provides (968) a fund release notification to producer 914 through the producer application 909. The payment node 908 optionally records (970) the payment receipt to the supply-chain ledger 906, and provides (972) the payment receipt to the retailer node 904. The retailer node 904 provides (974) the payment receipt to the consumer 912 through the consumer application 902, and the logic flow 900 ends.

Figure 10:
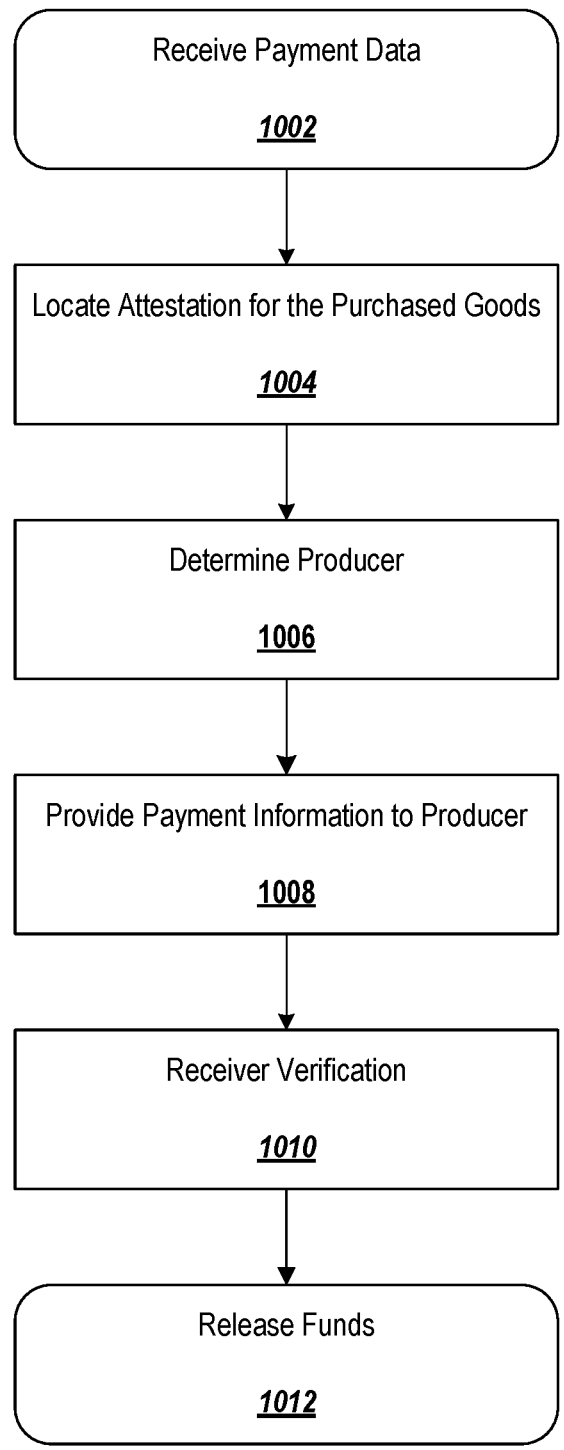
FIG. 10 depicts a flow diagram of an example process employed within a system with incentive structures to promote sustainable practices within a supply chain.

FIG. 10 depicts a flow diagram of an example process 1000 employed within a system with incentive structures to promote sustainable practices within, for example, a supply chain. Payment data is received (1002) from a purchaser of goods through a consumer application. The payment data including a targeted payment amount and a product identifier for the purchased goods. In some implementations, the payment data is digitally signed by the purchaser and the signature is verified.

From 1002, the process 1000 moves to 1004 where an attestation for a delivery of the purchased goods is located on a permissioned distributed ledger. The permissioned distributed ledger stores verified transactions within a supply chain for the purchased goods. The attestation is persisted on the permissioned distributed ledger as one of the verified transactions. The attestation indicates that the producer has been biometrically verified and that the purchased goods were delivered by the producer to a logistics company participating in the supply chain. In some implementations, a transaction for delivery of the purchased goods to a retailer where the purchased goods were sold to the purchaser is persisted in the permissioned distributed ledger. In some implementations, the purchased goods are employed in a manufacturing of a product, and the purchaser purchases the product.

From 1004, the process 1000 moves to 1006 where the attestation for a delivery from a producer of the purchased goods is processed to determine the producer of the purchased goods.

From 1006, the process 1000 moves to 1008 where payment information is provided to the producer through a producer application. The payment information includes the targeted payment amount.

From 1008, the process 1000 moves to 1010 where verification of an identity of the producer is received from the producer application. The verification based on biometric authentication. In some implementations, a record of the verification of the identity of the producer is persisted in an identity permissioned distributed ledger. The identity permissioned distributed ledger stores identity data elements, which include the public key, for verified participants of the supply chain. In some implementations, verification of the identity of the producer is based on matching biometric data collected from the producer and against an identity attestation digitally signed by an identity provider and the producer. The signed identity attestation is persisted as a record in the identity permissioned distributed ledger.

From 1010, the process 1000 moves to 1012 where funds for the targeted payment amount are released to the producer. In some implementations, before releasing funds for the targeted payment amount to the producer, a receipt attestation digitally signed by producer is received through the producer application and the signature verified. In some implementations, before receiving the payment data, a producer attestation that is persisted on the permissioned distributed ledger as one of the verified transactions is provided to the consumer application. The producer attestation includes proof of sustainable agricultural practices employed by the producer of the purchased goods and is located on the permissioned distributed ledger based on the product identifier. The proof of sustainable agricultural practices may include photographs, logs, or records of methods used to collect or produce the purchased goods. From 1012, the process 1000 ends.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination of one or more of them). A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, such as, a field programmable gate array (FPGA), an ASIC, or a graphics processing unit (GPU).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, implementations may be realized on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a LAN and a WAN, e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method executed by one or more processors, the method comprising:
   receiving, by a retailer node and from a purchaser of goods through a consumer application, payment data including a targeted payment amount and a product identifier for the purchased goods, the consumer application enabling a consumer to access a supply chain blockchain distributed ledger through the retailer node;
   based on the product identifier, locating, by the retailer node and on the supply chain blockchain distributed ledger, an attestation for a delivery of the purchased goods, wherein the supply chain blockchain distributed ledger stores verified transactions within a supply chain for the purchased goods, and wherein the attestation is persisted on the supply chain blockchain distributed ledger as one of the verified transactions;
   determining a producer of the purchased goods from the attestation located in the supply chain blockchain distributed ledger for a delivery from the producer of the purchased goods;
   locating, in a identity blockchain distributed ledger that stores records of verifications of identities of producers, a record of verification of an identity of the producer;
   validating the attestation located in the supply chain blockchain distributed ledger based on the record of verification of the identity of the producer located in the identity blockchain distributed ledger;
   providing, by a payment node through a producer application, payment information including the targeted payment amount to the producer that was determined from the attestation that was validated, the producer application enabling the producer to access the identity blockchain distributed ledger;
   receiving, by the payment node, verification of an identity of the producer from the producer application, that verification being based on biometric authentication; and
   releasing, by the payment node, funds for the targeted payment amount to the producer,
      the releasing of funds based on the biometric authentication.

2. The method of claim 1, wherein the identity blockchain distributed ledger stores identity data elements for verified participants of the supply chain, the identity data elements including a public key for each of the verified participants of the supply chain.

3. The method of claim 2, wherein the verification of the identity of the producer is based on matching biometric data collected from the producer and against an identity attestation digitally signed by an identity provider and the producer, the signed identity attestation persisted as a record in the identity blockchain distributed ledger.

4. The method of claim 1, wherein the payment data is digitally signed by the purchaser, and wherein the method comprises verifying the signature of the purchaser.

5. The method of claim 1, comprising:
receiving, through the producer application, a receipt attestation digitally signed by producer; and
before releasing funds for the targeted payment amount to the producer, verifying the signature of the producer.

6. The method of claim 1, comprising:
before receiving the payment data, providing a producer attestation comprising proof of sustainable agricultural practices employed by the producer of the purchased goods to the consumer application, wherein the producer attestation is persisted on the supply chain blockchain distributed ledger as one of the verified transactions, and wherein the producer attestation is located based on the product identifier.

7. The method of claim 6, wherein the proof of sustainable agricultural practices includes photographs, logs, or records of methods used to collect or produce the purchased goods.

8. The method of claim 1, wherein the attestation indicates that the producer has been biometrically verified and that the purchased goods were delivered by the producer to a logistics company participating in the supply chain.

9. The method of claim 8, wherein a transaction for delivery of the purchased goods to a retailer wherein the purchased goods were sold to the purchaser is persisted in the supply chain blockchain distributed ledger.

10. The method of claim 1, wherein the purchased goods are employed in a manufacturing of a product, and wherein the purchaser purchases the product.

11. One or more non-transitory computer-readable storage media coupled to one or more processors and having instructions stored thereon which, when executed by the one or more processors, cause the one or more processors to perform operations comprising:
receiving, by a retailer node and from a purchaser of goods through a consumer application, payment data including a targeted payment amount and a product identifier for the purchased goods, the consumer application enabling a consumer to access a supply chain blockchain distributed ledger through the retailer node;
based on the product identifier, locating, by the retailer node and on the supply chain blockchain distributed ledger, an attestation for a delivery of the purchased goods, wherein the supply chain blockchain distributed ledger stores verified transactions within a supply chain for the purchased goods, and wherein the attestation is persisted on the supply chain blockchain distributed ledger as one of the verified transactions;
determining a producer of the purchased goods from the attestation located in the supply chain blockchain distributed ledger for a delivery from the producer of the purchased goods;
locating in a identity blockchain distributed ledger that stores records of verifications of identities of producers, a record of verification of an identity of the producer;
validating the attestation located in the supply chain blockchain distributed ledger based on the record of verification of the identity of the producer located in the identity blockchain distributed ledger;
providing, by a payment node through a producer application, payment information including the targeted payment amount to the producer that was determined from the attestation that was validated, the producer application enabling the producer to access the identity blockchain distributed ledger;
receiving, by the payment node, verification of an identity of the producer from the producer application, that verification being based on biometric authentication; and
releasing, by the payment node, funds for the targeted payment amount to the producer,
the releasing of funds based on the biometric authentication.

12. The one or more non-transitory computer-readable media of claim 11, wherein the identity blockchain distributed ledger stores identity data elements for verified participants of the supply chain, the identity data elements including the a public key for each of the verified participants of the supply chain.

13. The one or more non-transitory computer-readable media of claim 12, wherein the verification of the identity of the producer is based on matching biometric data collected from the producer and against an identity attestation digitally signed by an identity provider and the producer, the signed identity attestation persisted as a record in the identity blockchain distributed ledger.

14. The one or more non-transitory computer-readable media of claim 11, wherein the operations comprise:
receiving, through the producer application, a receipt attestation digitally signed by producer; and
before releasing funds for the targeted payment amount to the producer, verifying the signature of the producer.

15. The one or more non-transitory computer-readable media of claim 11, wherein the operations comprise:
before receiving the payment data, providing a producer attestation comprising proof of sustainable agricultural practices employed by the producer of the purchased goods to the consumer application, wherein the producer attestation is persisted on the supply chain blockchain distributed ledger as one of the verified transactions, and wherein the producer attestation is located based on the product identifier.

16. A system, comprising:
one or more processors; and
a computer-readable storage device coupled to the one or more processors and having instructions stored thereon which, when executed by the one or more processors, cause the one or more processors to perform operations comprising:
receiving, by a retailer node and from a purchaser of goods through a consumer application, payment data including a targeted payment amount and a product identifier for the purchased goods, the consumer application enabling a consumer to access a supply chain blockchain distributed ledger through the retailer node;
based on the product identifier, locating, by the retailer node and on the supply chain blockchain distributed ledger, an attestation for a delivery of the purchased goods, wherein the supply chain blockchain distributed ledger stores verified transactions within a supply chain for the purchased goods, and wherein the attestation is persisted on the supply chain blockchain distributed ledger as one of the verified transactions;

determining a producer of the purchased goods from the attestation located in the supply chain blockchain distributed ledger for a delivery from the producer of the purchased goods;

locating in a identity blockchain distributed ledger that stores records of verifications of identities of producers, a record of verification of an identity of the producer;

validating the attestation located in the supply chain blockchain distributed ledger based on the record of verification of the identity of the producer located in the identity blockchain distributed ledger;

providing, by a payment node through a producer application, payment information including the targeted payment amount to the producer that was determined from the attestation that was validated, the producer application enabling the producer to access the identity blockchain distributed ledger;

receiving, by the payment node, verification of an identity of the producer from the producer application, that verification being based on biometric authentication; and releasing, by the payment node, funds for the targeted payment amount to the producer, the releasing of funds based on the biometric authentication.

17. The system of claim 16, wherein the operations comprise:

before receiving the payment data, providing a producer attestation comprising proof of sustainable agricultural practices employed by the producer of the purchased goods to the consumer application, wherein the producer attestation is persisted on the supply chain blockchain distributed ledger as one of the verified transactions, and wherein the producer attestation is located based on the product identifier.

18. The system of claim 17, wherein the proof of sustainable agricultural practices includes photographs, logs, or records of methods used to collect or produce the purchased goods.

19. The system of claim 16, wherein the attestation indicates that the producer has been biometrically verified and that the purchased goods were delivered by the producer to a logistics company participating in the supply chain.

* * * * *